US012287666B2

(12) United States Patent
Wang et al.

(10) Patent No.: US 12,287,666 B2
(45) Date of Patent: Apr. 29, 2025

(54) CLOCK SYNCHRONIZATION METHOD, APPARATUS, AND SYSTEM IN DISTRIBUTED SYSTEM

(71) Applicant: HUAWEI TECHNOLOGIES CO., LTD., Guangdong (CN)

(72) Inventors: Jiang Wang, Beijing (CN); Rui Wang, Shenzhen (CN); Zhaoqi Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 61 days.

(21) Appl. No.: 18/175,365

(22) Filed: Feb. 27, 2023

(65) Prior Publication Data
US 2023/0213962 A1 Jul. 6, 2023

Related U.S. Application Data

(63) Continuation of application No. PCT/CN2021/099640, filed on Jun. 11, 2021.

(30) Foreign Application Priority Data

Aug. 31, 2020 (CN) .......................... 202010906862.6

(51) Int. Cl.
*G06F 1/12* (2006.01)
(52) U.S. Cl.
CPC ..................... *G06F 1/12* (2013.01)
(58) Field of Classification Search
CPC .............. G06F 1/08; G06F 1/10; G06F 1/12
See application file for complete search history.

(56) References Cited

U.S. PATENT DOCUMENTS 5,907,685 A * 5/1999 Douceur ................. G06F 1/14
713/400
8,582,606 B2 * 11/2013 Pignatelli .............. H04J 3/0655
370/503

(Continued)

FOREIGN PATENT DOCUMENTS

WO 2006044139 A2 4/2006

OTHER PUBLICATIONS

IEEE Std 1588-2008 (Revision of IEEE Std 1588-2002), "IEEE Standard for a Precision Clock Synchronization Protocol for Networked Measurement and Control Systems," Sponsor Technical Committee on Sensor Technology (TC-9) of the IEEE Instrumentation and Measurement Society, Mar. 27, 2008, 289 pages.

(Continued)

*Primary Examiner* — Jaweed A Abbaszadeh
*Assistant Examiner* — Cheri L Harrington
(74) *Attorney, Agent, or Firm* — Fish & Richardson P.C.

(57) ABSTRACT

This application discloses a clock synchronization method and a related apparatus in a distributed system. The distributed system includes a plurality of nodes, and the plurality of nodes include a master node and a plurality of slave nodes. The master node obtains a plurality of local clock offsets, where each of the plurality of local clock offsets indicates a clock offset between two nodes in the distributed system. The master node determines a global clock offset of a target slave node relative to the master node based on the plurality of local clock offsets, and sends the global clock offset to the target slave node. The target slave node obtains a clock reference value of a local clock, and then performs clock synchronization based on the clock reference value and the global clock offset.

20 Claims, 10 Drawing Sheets

(56) References Cited

U.S. PATENT DOCUMENTS

| | | | |
|---|---|---|---|
| 9,203,600 B1 | 12/2015 | Hochschild et al. | |
| 9,998,247 B1* | 6/2018 | Choudhury | H04J 3/0602 |
| 2003/0040328 A1* | 2/2003 | Indirabhai | H04W 56/00 |
| | | | 455/502 |
| 2011/0268097 A1* | 11/2011 | Agrawala | G01S 5/0289 |
| | | | 370/350 |
| 2013/0279525 A1* | 10/2013 | Zheng | H04J 3/0667 |
| | | | 370/516 |
| 2019/0116021 A1* | 4/2019 | Tanwar | H04J 3/0673 |
| 2020/0252424 A1* | 8/2020 | Regev | H04J 3/0667 |
| 2020/0396051 A1* | 12/2020 | Geng | H04L 7/033 |

OTHER PUBLICATIONS

Levesque et al., "A Survey of Clock Synchronization Over Packet-Switched Networks," IEEE Communications Surveys and Tutorials, vol. 18, No. 4, Nov. 18, 2016, 22 pages.

Extended European Search Report in European Appln No. 21859780. 5, dated Jan. 22, 2024, 9 pages.

* cited by examiner

CLOCK SYNCHRONIZATION METHOD, APPARATUS, AND SYSTEM IN DISTRIBUTED SYSTEM

CROSS-REFERENCE TO RELATED APPLICATIONS

This application is a continuation of International Application No. PCT/CN2021/099640, filed on Jun. 11, 2021, which claims priority to Chinese Patent Application No. 202010906862.6, filed on Aug. 31, 2020. The disclosures of the aforementioned applications are hereby incorporated by reference in their entireties.

TECHNICAL FIELD

This application relates to the computer field, and specifically, to a clock synchronization method, an apparatus, and a system that are in a distributed system.

BACKGROUND

In a distributed system including a plurality of devices, each device maintains an independent clock crystal oscillator. Therefore, to ensure that each device has a unified time line, clock synchronization needs to be performed between the devices. For example, in a distributed database system, to ensure that data that belongs to a same transaction but is distributed on different servers is invoked in order, a clock synchronization method needs to be used to keep clocks of all servers as synchronized as possible.

In a current clock synchronization process, a master clock source generally provides a clock source for each server in the system, but a time delay occurs when the clock source is transmitted to the server. After receiving the clock source, the server performs local clock synchronization based on a time delay of network transmission.

However, different servers have different clock crystal oscillators, and the clock crystal oscillators vary with factors such as temperature and voltage. As a result, timing precision is different. Therefore, synchronization precision of a current clock synchronization solution is low. This is urgently to be resolved.

SUMMARY

Embodiments of this application provide a clock synchronization method in a distributed system, to improve clock synchronization precision. Embodiments of this application further provide a corresponding apparatus and system.

According to a first aspect of this application, a distributed system is provided, where the distributed system includes a plurality of nodes, and the plurality of nodes include a master node and a plurality of slave nodes. The master node is configured to: obtain a plurality of local clock offsets, where each of the plurality of local clock offsets indicates a clock offset between two nodes in the distributed system; determine a first global clock offset of a target slave node in the plurality of slave nodes relative to the master node based on the plurality of local clock offsets; and send the first global clock offset to the target slave node. The target slave node is configured to: receive the first global clock offset of the target slave node relative to the master node sent by the master node; obtain a clock reference value, where the clock reference value indicates a local clock of the target slave node; and perform clock synchronization based on the clock reference value and the first global clock offset.

The "node" in this application may be a physical machine, for example, a server, or may be a virtual machine (virtual machine, VM) or a container (container).

In a possible design, the distributed system is a distributed database system, and the plurality of nodes include a server or a data node that is in the distributed database system and that is configured to store data, or a VM or a container that is configured to store data.

In the distributed system provided in the first aspect, two nodes with local clock offsets have a directional relationship, and the directional relationship indicates a relative direction. For example, if a first node in the two nodes points to a second node, it indicates that a clock offset of the second node relative to the first node needs to be determined. If one node and the other node are used to represent the two nodes, the one node is the first node, and the other node is the second node. The master node determines a corresponding global clock offset for each slave node. It should be noted that, in this application, the "local clock offset" is a clock offset between two nodes having a directional relationship, and the "global clock offset" is a clock offset that is of each slave node relative to the master node and that is obtained after the master node corrects a plurality of local clock offsets. "A plurality of" is used in this application. The "plurality of" includes two or more, or may be represented as at least two. The global clock offset is obtained by performing error equalization by the master node on a relative offset in the distributed system. A synchronization clock of the target slave node may be obtained by adding the clock reference value and the first global clock offset. It can be learned from the first aspect that, the master node may determine the global clock offset between each slave node and the master node based on the plurality of local clock offsets between two nodes. In this way, compared with a case in which each node in the distributed system can perform clock synchronization only based on a local clock offset, in this application, global error equalization can be implemented by determining the global clock offset by the master node. This helps improve clock synchronization precision of each node. Clock synchronization precision in this application can reach 1 microsecond (µs).

In a possible implementation of the first aspect, the target slave node is configured to obtain the clock reference value from a register of a processor, where the clock reference value is synchronized by a network adapter device (network adapter) of the target slave node to the register of the processor over a physical link between the network adapter device and the processor.

In this possible implementation, the network adapter device of the target slave node may communicate with the processor over a physical link. The processor may include a clock unit, where the clock unit is the register. A network adapter clock unit in the network adapter device may synchronize, over the physical link, a latest clock reference value obtained by the network adapter clock unit to the register used as the clock unit in the processor. In this way, when clock synchronization is implemented by using software, the processor runs a program used for clock synchronization. The processor can obtain the clock reference value from the clock register of the processor, and does not need to obtain the clock reference value from a network adapter clock device. This improves a clock synchronization speed.

In a possible implementation of the first aspect, a topology diagram of the distributed system includes at least one linearly independent loop, each linearly independent loop includes at least three nodes associated based on a clockwise or counterclockwise directional relationship, every two of the at least three nodes having a directional relationship have one local clock offset, and the at least three nodes include the master node, or the at least three nodes are all slave nodes.

In this possible implementation, the at least three nodes associated according to a clockwise or counterclockwise directional relationship means that a directional relationship between each node pair having a directional relationship on a linearly independent loop is in one direction, for example, a node A→a node B→a node C→the node A. It should be noted that no bidirectional relationship exists in the linearly independent loop in this application. The linearly independent loop of the node A→node B→node C→node A includes three local clock offsets, which are a local clock offset of the node B relative to the node A, a local clock offset of the node C relative to the node B, and a local clock offset of the node A relative to the node C. The local clock offsets are obtained in a linearly independent loop manner. This is beneficial for equalizing clock offsets between the slave nodes and the master node in the distributed system.

In a possible implementation of the first aspect, one of the two nodes is configured to: send a plurality of probe packets to the other node; receive a plurality of response packets corresponding to the plurality of probe packets sent by the other node, where the plurality of probe packets are in a one-to-one correspondence with the plurality of response packets; determine a clock offset relationship between the master node and the other node based on sending time points and receiving time points of the plurality of probe packets and sending time points and receiving time points of the plurality of response packets; and determine a local clock offset of the other node relative to the one node based on the clock offset relationship, where the one node is the master node or the target slave node.

In this possible implementation, the clock offset relationship is determined by using a plurality of pieces of upper limit data and a plurality of pieces of lower limit data between the one node and the other node. Each piece of upper limit data is a first time difference between a first time point at which the other node receives a probe packet and a second time point at which the one node sends the probe packet. Each piece of lower limit data is a second time difference between a third time point at which the other node sends a response packet corresponding to the probe packet and a fourth time point at which the one node receives the response packet, where the response packet corresponds to the probe packet. The clock offset of the other node relative to the one node is determined based on the clock offset relationship, where the one node is the master node or the target slave node. In this application, for two nodes having a directional relationship on the linearly independent loop, upper limit data and lower limit data may be collected by sending a probe packet and returning a response packet, to determine a clock offset relationship between the two nodes. It should be noted that a clock synchronization process in this application is continuously performed, and probe packets and response packets between two nodes are also continuously sent. Therefore, in this application, latest upper limit data and latest lower limit data are determined based on time points in a latest probe packet and a response packet, to update the clock offset relationship. Because a large amount of upper limit data and lower limit data need to be used for determining the clock offset relationship, the process may also be understood as a process of machine learning, and a linear relationship is obtained based on a large amount of data, and the linear relationship may be updated based on the latest upper limit data and lower limit data. In this implementation, it can be ensured that the master node obtains a latest clock offset. This improves clock synchronization precision.

In a possible implementation of the first aspect, one of the two nodes is configured to: send a plurality of probe packets to the other node; receive a plurality of response packets corresponding to the plurality of probe packets sent by the other node, where the plurality of probe packets are in a one-to-one correspondence with the plurality of response packets; send a plurality of follow-up packets, where the plurality of follow-up packets are in a one-to-one correspondence with the plurality of probe packets, and an interval between a sending time point of each probe packet and a sending time point of a follow-up packet corresponding to the probe packet is within a first preset time interval; determine at least one target probe packet from the plurality of probe packets, where an interval between a receiving time point at which the other node receives the at least one target probe packet and a receiving time point at which the other node receives a follow-up packet corresponding to the at least one target probe packet is within a second preset time interval; determine a clock offset relationship between the one node and the other node based on a sending time point and the receiving time point of the at least one target probe packet and a sending time point and a receiving time point of a response packet corresponding to the at least one target probe packet; and determine a local clock offset of the other node relative to the one node based on the clock offset relationship.

In this possible implementation, considering that a transmission exception may occur during network transmission, there may be a probe packet that is suitable for determining the clock offset relationship. Therefore, a corresponding first follow-up packet may be sent after a first preset time interval (for example, S seconds) after a first probe packet is sent. Whether the first probe packet is valid is determined based on whether a time interval between receiving the first follow-up packet and receiving the first probe packet by the other node is within a second preset time interval. If the time interval is within the second preset time interval, the first probe packet is valid. If the time interval is not within the second preset time interval, the first probe packet is filtered out. The second preset time interval may be less than or equal to the first preset time interval, and the second preset time interval may alternatively be a range including the first preset time interval, for example, [S−a, S+a]. In other words, if an interval between a receiving time point at which the other node receives the first probe packet and a receiving time point at which the other node receives the corresponding first follow-up packet is within the range of [S−a, S+a], the first probe packet is valid, and the first probe packet may be used in determining a clock offset relationship. If an interval between a receiving time point at which the other node receives the first probe packet and a receiving time point at which the other node receives the corresponding first follow-up packet is beyond the range of [S−a, S+a], the first probe packet is invalid, cannot be used in determining a clock offset relationship, and needs to be filtered out. The target probe packet is a probe packet that remains after being filtered and that can be used in determining the clock offset relationship. In this implementation, a probe packet that is greatly affected by network transmission is filtered out, so that clock synchronization precision can be further improved.

In a possible implementation of the first aspect, one node sends one follow-up packet for each probe packet at a preset time interval after sending a plurality of probe packets. Then, whether a corresponding first probe packet is used in determining the clock offset relationship is determined based on a difference between a third time difference and a first time difference, where the third time difference is a difference between a fifth time point at which another node receives a first follow-up packet and a sixth time point at which the one node sends the first follow-up packet, the first probe packet is any one of the plurality of probe packets, and the first follow-up packet corresponds to the first probe packet. The first follow-up packet may alternatively correspond to one first response packet, and the first response packet may include the fifth time point at which the another node receives the first follow-up packet. If a difference between the third time difference and the first time difference is within a threshold range, it is determined that the first probe packet is used in determining the clock offset relationship. If a difference between the third time difference and the first time difference is beyond the threshold range, the first probe packet is invalid, cannot be used in determining the clock offset relationship, and needs to be filtered out.

In this possible implementation, whether the first probe packet is valid may be determined by comparing a time difference between transmission of the first probe packet from the one node to the another node and a time difference between transmission of the first follow-up packet from the one node to the another node. If the difference between the third time difference and the first time difference is within the threshold range, for example, within [−a, a], it indicates that this network is normal, and the first probe packet is valid and can be used in determining of the clock offset relationship. If the difference between the third time difference and the first time difference is beyond the threshold range, for example, not in [−a, a], it indicates that this network is abnormal, the first probe packet is invalid and cannot be used in determining the clock offset relationship, and the first probe packet needs to be filtered out. a may be a preset small value.

In a possible implementation of the first aspect, the master node is configured to correct the plurality of local clock offsets to obtain a plurality of corrected local clock offsets, where a sum of the plurality of corrected local clock offsets is equal to 0. The plurality of corrected local clock offsets include a second global clock offset of a first slave node relative to the master node. The first slave node has a direct pointing relationship with the master node, the target slave node is the first slave node, and the second global clock offset is a first global clock offset.

In a possible implementation of the first aspect, the master node is configured to determine a clock offset relationship between a second slave node and the master node based on a clock offset relationship between the first slave node and the master node and a clock offset relationship between the second slave node and the first master node, where the first slave node has a direct directional relationship with the master node, and the second slave node has no direct directional relationship with the master node; and determine a third global clock offset of the second slave node relative to the master node based on the clock offset relationship between the second slave node and the master node, where the target slave node is the second slave node, and the third global clock offset is the first global clock offset.

In this possible implementation, theoretically, a sum of local clock offsets of at least three node pairs of a same linearly independent loop should be equal to 0. However, in an actual scenario, a sum of local clock offsets of a same linearly independent loop is usually not equal to 0. In this application, local clock offsets on each linearly independent loop in the distributed system are obtained, and then correction is performed with a goal that a sum of local clock offsets on each linearly independent loop in the distributed system is equal to 0, to obtain a plurality of corrected local clock offsets. If the plurality of corrected local clock offsets include a clock offset between each slave node and the master node in the distributed system, a global clock offset of each slave node relative to the master node may be directly determined from the plurality of corrected local clock offsets. If a global clock offset of a specific slave node is not included in the plurality of corrected local clock offsets, a "rumor propagation" manner may be used. A clock offset relationship between the master node and the slave node that has no direct directional relationship with the master node is determined by using a node that has a direct directional relationship with the master node, to further determine the global clock offset between the slave node and the master node. It can be learned from this possible implementation that, the master node can not only implement global error equalization, but may also determine, in the "rumor propagation" manner, a global clock offset of a slave node that is not directly related to the master node.

A second aspect of this application provides a clock synchronization method in a distributed system, where the distributed system includes a plurality of nodes, the plurality of nodes include a master node and a plurality of slave nodes. The method includes: A target slave node in the plurality of slave nodes obtains a global clock offset sent by the master node, where the global clock offset indicates a clock offset of the target slave node relative to the master node, the global clock offset is determined based on a plurality of local clock offsets, and each of the plurality of local clock offsets indicates a clock offset between two nodes in the distributed system. The target slave node obtains a clock reference value, where the clock reference value indicates a local clock of the target slave node. The target slave node performs clock synchronization based on the clock reference value and the global clock offset.

For related content of the second aspect, refer to content of the first aspect for understanding. According to the second aspect, the slave node may perform clock synchronization based on the global clock offset sent by the master node. Because the global clock offset is obtained by the master node through global error equalization, compared with a case in which each node in the distributed system can perform clock synchronization only based on a local clock offset, in this application, clock synchronization precision of each node is improved. Clock synchronization precision in this application can reach 1 microsecond (μs).

In a possible implementation of the second aspect, the foregoing step in which the target slave node obtains the clock reference value includes: The target slave node obtains the clock reference value from a register of a processor, where the clock reference value is synchronized by a network adapter device of the target slave node to the register over a physical link between the network adapter device and the processor.

In this possible implementation, the network adapter device of the target slave node may communicate with the processor over a physical link. The processor may include a clock unit, where the clock unit is the register. A network adapter clock unit in the network adapter device may synchronize, over the physical link, a latest clock reference value obtained by the network adapter clock unit to the register used as the clock unit in the processor. In this way, when clock synchronization is implemented by using software, the processor can obtain the clock reference value from the register of the processor, and does not need to obtain the clock reference value from a network adapter clock device. This improves a clock synchronization speed.

In a possible implementation of the second aspect, the plurality of local clock offsets include a local clock offset of another node relative to the target slave node. The method further includes: The target slave node sends a plurality of probe packets to the another node. The target slave node receives a plurality of response packets corresponding to the plurality of probe packets sent by the another node, where the plurality of probe packets are in a one-to-one correspondence with the plurality of response packets. The target slave node determines a clock offset relationship between the target slave node and the another node based on sending time points and receiving time points of the plurality of probe packets and sending time points and receiving time points of the plurality of response packets. The target slave node determines a local clock offset of the another node relative to the target slave node based on the clock offset relationship.

In a possible implementation of the second aspect, the plurality of local clock offsets include a local clock offset of another node relative to the target slave node. The method further includes: The target slave node sends a plurality of probe packets to the another node. The target slave node receives a plurality of response packets corresponding to the plurality of probe packets sent by the another node, where the plurality of probe packets are in a one-to-one correspondence with the plurality of response packets. The target slave node sends a plurality of follow-up packets, where the plurality of follow-up packets are in a one-to-one correspondence with the plurality of probe packets, and an interval between a sending time point of each probe packet and a sending time point of a follow-up packet corresponding to the probe packet is within a first preset time interval. The target slave node determines at least one target probe packet from the plurality of probe packets, where an interval between a receiving time point at which the another node receives the at least one target probe packet and a receiving time point at which the another node receives a follow-up packet corresponding to the at least one target probe packet is within a second preset time interval. The target slave node determines a clock offset relationship between the target slave node and the another node based on a sending time point and the receiving time point of the at least one target probe packet and a sending time point and a receiving time point of a response packet corresponding to the at least one target probe packet. The target slave node determines a local clock offset of the another node relative to the target slave node based on the clock offset relationship.

In a possible implementation of the second aspect, the method further includes: The target slave node sends one follow-up packet for each probe packet at a preset time interval after sending a plurality of probe packets. Then, whether a corresponding first probe packet is used in determining the clock offset relationship is determined based on a difference between a third time difference and a first time difference, where the third time difference is a difference between a fifth time point at which another node receives a first follow-up packet and a sixth time point at which the target slave node sends the first follow-up packet, the first probe packet is any one of the plurality of probe packets, and the first follow-up packet corresponds to the first probe packet. The first follow-up packet may alternatively correspond to one first response packet, and the first response packet may include the fifth time point at which the another node receives the first follow-up packet. If a difference between the third time difference and the first time difference is within a threshold range, it is determined that the first probe packet is used in determining the clock offset relationship. If a difference between the third time difference and the first time difference is beyond the threshold range, the first probe packet is invalid cannot be used in determining the clock offset relationship, and needs to be filtered out.

For content in any possible implementation of the second aspect, refer to content in the first aspect for understanding.

A third aspect of this application provides a clock synchronization method in a distributed system, where the distributed system includes a plurality of nodes, the plurality of nodes include a master node and a plurality of slave nodes. The method includes: The master node obtains a plurality of local clock offsets, where each of the plurality of local clock offsets indicates a clock offset between two nodes in the distributed system. The master node determines a first global clock offset of a target slave node in the plurality of slave nodes relative to the master node based on the plurality of local clock offsets. The master node sends the first global clock offset to the target slave node, where the first global clock offset is used by the target slave node to perform clock synchronization.

For related content of the third aspect, refer to content of the first aspect for understanding. According to the third aspect, the master node may determine the global clock offset between each slave node and the master node based on the plurality of local clock offsets between two nodes. In this way, compared with a case in which each node in the distributed system can perform clock synchronization only based on a local clock offset, in this application, global error equalization can be implemented by determining the global clock offset by the master node. This helps improve clock synchronization precision of each node. Clock synchronization precision in this application can reach 1 microsecond (µs).

In a possible implementation of the third aspect, a topology diagram of the distributed system includes at least one linearly independent loop, each linearly independent loop includes at least three nodes associated based on a clockwise or counterclockwise directional relationship, every two of the at least three nodes having a directional relationship have one local clock offset, and the at least three nodes include the master node, or the at least three nodes are all slave nodes.

In a possible implementation of the third aspect, the plurality of local clock offsets include a local clock offset of another node relative to the master node. The method further includes: The master node sends a plurality of probe packets to the another node. The master node receives a plurality of response packets corresponding to the plurality of probe packets sent by the another node, where the plurality of probe packets are in a one-to-one correspondence with the plurality of response packets. The master node determines a clock offset relationship between the master node and the another node based on sending time points and receiving time points of the plurality of probe packets and sending time points and receiving time points of the plurality of response packets. The master node determines a local clock offset of the another node relative to the master node based on the clock offset relationship.

In a possible implementation of the third aspect, the plurality of local clock offsets include a local clock offset of another node relative to the master node. The method further includes: The master node sends a plurality of probe packets to the another node. The master node receives a plurality of response packets corresponding to the plurality of probe packets sent by the another node, where the plurality of probe packets are in a one-to-one correspondence with the plurality of response packets. The master node sends a plurality of follow-up packets, where the plurality of follow-up packets are in a one-to-one correspondence with the plurality of probe packets, and an interval between a sending time point of each probe packet and a sending time point of a follow-up packet corresponding to the probe packet is within a first preset time interval. The master node determines at least one target probe packet from the plurality of probe packets, where an interval between a receiving time point at which the another node receives the at least one target probe packet and a receiving time point at which the another node receives a follow-up packet corresponding to the at least one target probe packet is within a second preset time interval. The master node determines a clock offset relationship between the master node and the another node based on a sending time point and the receiving time point of the at least one target probe packet and a sending time point and a receiving time point of a response packet corresponding to the at least one target probe packet. The master node determines a local clock offset of the another node relative to the master node based on the clock offset relationship.

In a possible implementation of the third aspect, the master node sends one follow-up packet for each probe packet at a preset time interval after sending a plurality of probe packets. Then, whether a corresponding first probe packet is used in determining the clock offset relationship is determined based on a difference between a third time difference and a first time difference, where the third time difference is a difference between a fifth time point at which another node receives a first follow-up packet and a sixth time point at which the master node sends the first follow-up packet, the first probe packet is any one of the plurality of probe packets, and the first follow-up packet corresponds to the first probe packet. The first follow-up packet may alternatively correspond to one first response packet, and the first response packet may include the fifth time point at which the another node receives the first follow-up packet. If a difference between the third time difference and the first time difference is within a threshold range, it is determined that the first probe packet is used in determining the clock offset relationship. If a difference between the third time difference and the first time difference is beyond the threshold range, the first probe packet is invalid cannot be used in determining the clock offset relationship, and needs to be filtered out.

In a possible implementation of the third aspect, the foregoing step in which the master node determines the first global clock offset of the target slave node in the plurality of slave nodes relative to the master node based on the plurality of local clock offsets includes: The master node corrects the plurality of local clock offsets to obtain a plurality of corrected local clock offsets, where a sum of the plurality of corrected local clock offsets is equal to 0. The plurality of corrected local clock offsets include a second global clock offset of a first slave node relative to the master node. The first slave node has a direct pointing relationship with the master node, the target slave node is the first slave node, and the second global clock offset is a first global clock offset.

In a possible implementation of the third aspect, that the master node determines a first global clock offset of a target slave node in the plurality of slave nodes relative to the master node based on the plurality of local clock offsets includes: The master node determines a clock offset relationship between a second slave node and the master node based on a clock offset relationship between the first slave node and the master node and a clock offset relationship between the second slave node and the first master node, where the first slave node has a direct directional relationship with the master node, and the second slave node has no direct directional relationship with the master node. The master node determines a third global clock offset of the second slave node relative to the master node based on the clock offset relationship between the second slave node and the master node, where the target slave node is the second slave node, and the first global clock offset is the third global clock offset.

In a possible implementation of the third aspect, a clock source of the master node is from a satellite clock.

In this possible implementation, global clock synchronization may be implemented by using a satellite clock.

For content in any possible implementation of the third aspect, refer to content in the first aspect for understanding.

According to a fourth aspect of this application, a clock synchronization apparatus is provided. The apparatus includes modules or units configured to perform the method according to any one of the second aspect or the possible implementations of the second aspect, for example, a receiving unit, an obtaining unit, and a processing unit. It should be noted that the obtaining unit and the processing unit may be implemented by using one processing unit.

According to a fifth aspect of this application, a clock synchronization apparatus is provided. The apparatus includes modules or units configured to perform the method in any one of the third aspect or the possible implementations of the third aspect, for example, a receiving unit, a processing unit, and a sending unit.

According to a sixth aspect of this application, a clock synchronization apparatus is provided. The apparatus may include at least one processor, a memory, and a communication interface. The processor is coupled to the memory and the communication interface. The memory is configured to store instructions. The processor is configured to execute the instructions. The communication interface is configured to communicate with another network element under control of the processor. When the instructions are executed by the processor, the processor performs the method according to any one of the second aspect or the possible implementations of the second aspect.

According to a seventh aspect of this application, a clock synchronization apparatus is provided. The apparatus may include at least one processor, a memory, and a communication interface. The processor is coupled to the memory and the communication interface. The memory is configured to store instructions. The processor is configured to execute the instructions. The communication interface is configured to communicate with another network element under control of the processor. When the instructions are executed by the processor, the processor performs the method according to any one of the third aspect or the possible implementations of the third aspect.

According to an eighth aspect of this application, a computer-readable storage medium is provided. The computer-readable storage medium stores a program, and the program enables a processor to perform the clock synchronization method in a distributed system according to any one of the second aspect and the implementations of the second aspect.

According to a ninth aspect of this application, a computer-readable storage medium is provided. The computer-readable storage medium stores a program, and the program enables a processor to perform the clock synchronization method in a distributed system according to any one of the third aspect or the possible implementations of the third aspect.

According to a tenth aspect of this application, a computer program product (or referred to as a computer program) is provided. The computer program product includes computer-executable instructions, and the computer-executable instructions are stored in a computer-readable storage medium. At least one processor of a device may read the computer-executable instructions from the computer-readable storage medium, and the at least one processor executes the computer-executable instructions, so that the device implements the clock synchronization method in a distributed system according to any one of the second aspect or the possible implementations of the second aspect.

According to an eleventh aspect of this application, a computer program product is provided. The computer program product includes computer-executable instructions, and the computer-executable instructions are stored in a computer-readable storage medium. At least one processor of a device may read the computer-executable instructions from the computer-readable storage medium, and the at least one processor executes the computer-executable instructions, so that the device implements the clock synchronization method in a distributed system according to any one of the third aspect or the possible implementations of the third aspect.

A twelfth aspect of this application provides a node. The node includes a processor and a network adapter device. The processor is configured to execute a computer program (instruction), to implement the clock synchronization method according to any one of the second aspect or the possible implementations of the second aspect.

In a possible implementation, the processor includes a processor clock unit, configured to store a processor clock. The network adapter device includes a network adapter clock unit, configured to store a physical clock of the network adapter device.

In a possible implementation, there is a physical link between the processor clock unit and the network adapter clock unit, and a reference value of the physical clock of the network adapter device is synchronized to the processor clock unit.

In a possible implementation, the processor determines the clock reference value by reading a value of the processor clock unit.

A thirteenth aspect of this application provides a chip system. The chip system includes a processor, configured to support a clock synchronization apparatus in implementing a function in any one of the third aspect or the possible implementations of the third aspect. In a possible design, the chip system may further include a memory, for example, a clock register, configured to store program instructions and data required for clock synchronization, for example, a clock of the processor. The chip system may include a chip, or may include a chip and another discrete component.

It may be understood that any clock synchronization apparatus, computer storage medium, or computer program product provided above is configured to perform a corresponding clock synchronization method provided above. Therefore, for beneficial effects that can be achieved, refer to beneficial effects in the corresponding method provided above, and details are not described herein again.

DESCRIPTION OF EMBODIMENTS

The following describes embodiments of this application with reference to the accompanying drawings. It is clear that the described embodiments are merely some but not all of embodiments of this application. A person of ordinary skill in the art may learn that the technical solutions provided in embodiments of this application are also applicable to a similar technical problem as a technology develops and a new scenario emerges.

In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances so that embodiments of the present invention described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Embodiments of this application provide a clock synchronization method in a distributed system, to improve clock synchronization precision. Embodiments of this application further provide a corresponding apparatus and system. Details are separately described in the following.

The clock synchronization method provided in embodiment of this application may be applied to a distributed system (distributed system). The distributed system may be a distributed database system, or may be a distributed system in another scenario. The distributed system may alternatively be referred to as a cluster. The following describes a distributed system provided in an embodiment of this application with reference to FIG. 1.

Figure 1:
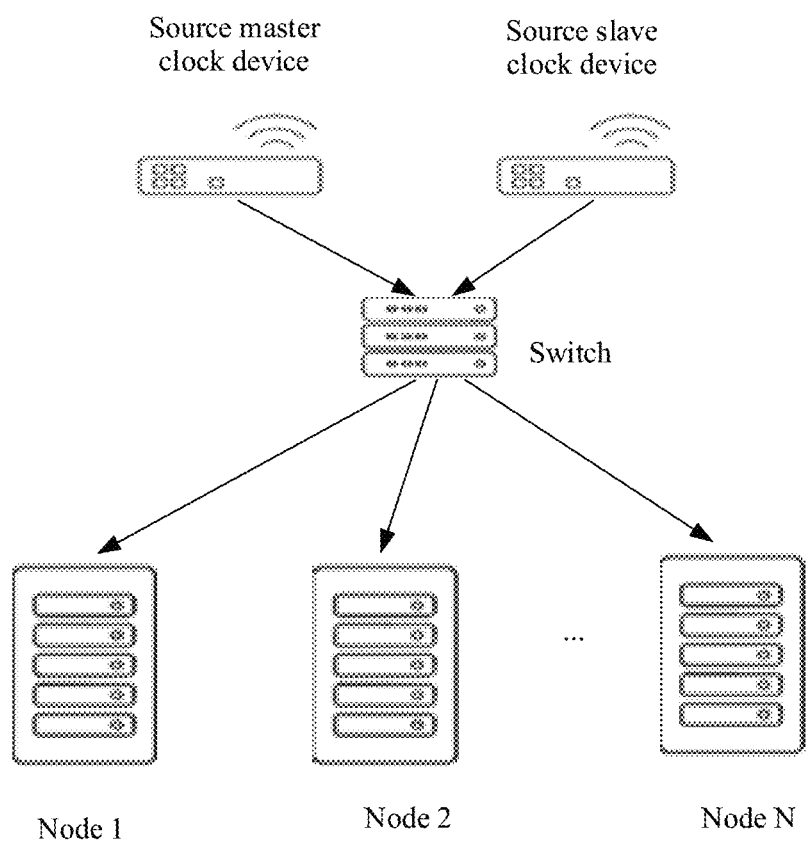
FIG. 1 is a schematic diagram of an embodiment of a distributed system.

As shown in FIG. 1, the distributed system includes a source master clock device, a source slave clock device, and a plurality of nodes, for example, a node 1, a node 2, ..., and a node N in FIG. 1, where N is an integer greater than 2. The source master clock device provides a clock source for each of the plurality of nodes, and the source slave clock device takes over work of the source master clock device when the source master clock device is faulty, and provides a clock source for each node. The source master clock device and the source slave clock device may be a building integrated timing supply system (building integrated timing supply system, BITS) clock source, and the BITS clock source may provide a reference time signal. The node may be a physical device such as a server or a computer, or may be a logical entity such as a virtual machine (virtual machine, VM) or a container (container). For example, if the distributed system is a distributed database system, the plurality of nodes may include a data node, a coordinator node, and the like in the distributed database system. Both the data node and the coordinator node are deployed on the database server.

Each node in the distributed system may obtain a clock source from the source master clock device, and then the node performs clock synchronization with reference to a local clock offset to obtain a synchronization clock, so that each node has a unified time line. However, this clock synchronization mode has low precision.

Therefore, embodiments of this application provide a clock synchronization method in a distributed system. A master node may be determined from a plurality of nodes in the distributed system, and another node is used as a slave node. The master node performs global correction with reference to clock offsets between two nodes having a directional relationship in the distributed system, to determine a global clock offset of each slave node relative to the master node. The slave node performs local clock synchronization of the slave node based on the global clock offset and a local reference clock.

The plurality of nodes in the distributed system shown in FIG. 1 may include one master node, and a node other than the master node is a slave node. The master node may be configured during deployment of the distributed system, or may be dynamically allocated after the distributed system is configured. If a new node is added to or a node is deleted from the distributed system, the master node may be reconfigured.

It should be noted that, in this application, the "local clock offset" is a clock offset between two nodes having a directional relationship, and the "global clock offset" is a clock offset that is of each slave node relative to the master node and that is obtained after the master node corrects a plurality of local clock offsets. "A plurality of" is used in this application. The "plurality of" includes two or more, or may be represented as at least two.

Figure 2:
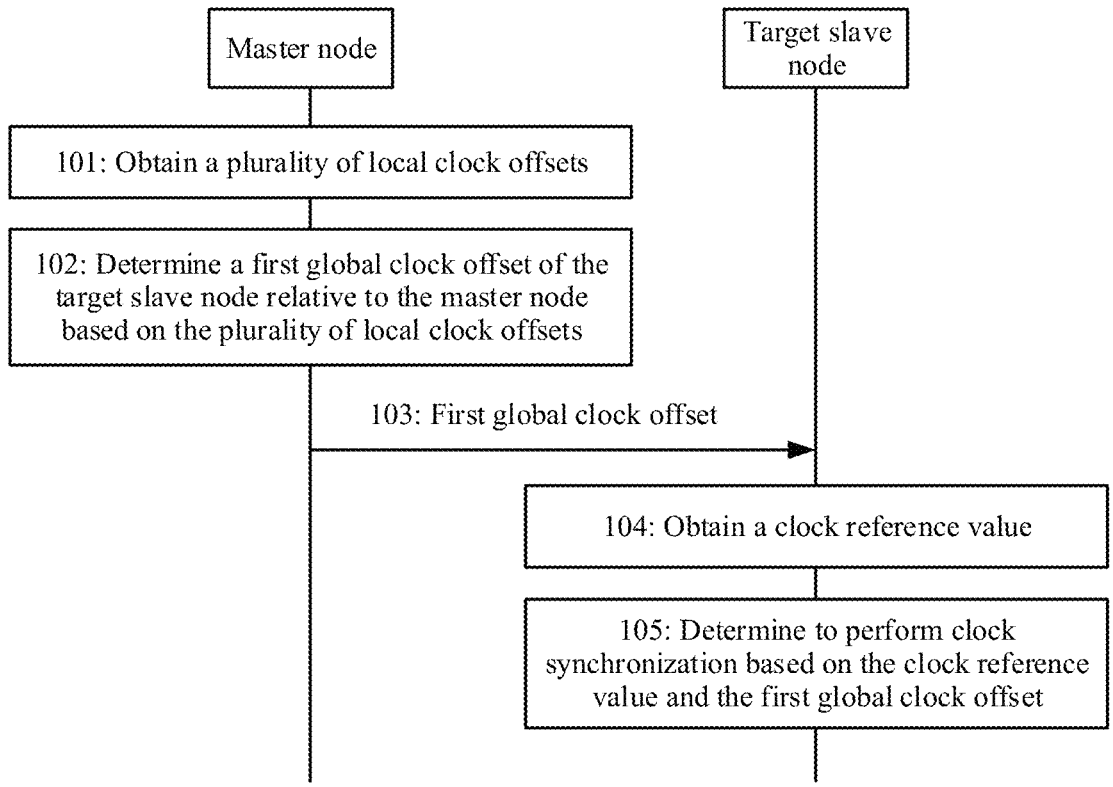
FIG. 2 is a schematic diagram of an embodiment of a clock synchronization method according to embodiments of this application.

Based on the foregoing distributed system, the following describes, with reference to FIG. 2, a clock synchronization method according to embodiments of this application. As shown in FIG. 2, an embodiment of the clock synchronization method according to embodiments of this application includes the following steps.

101: A master node obtains a plurality of local clock offsets.

Each of the plurality of local clock offsets indicates a clock offset between two nodes in the distributed system. The two nodes have a directional relationship. One of the two nodes may be a master node, and the other may be a slave node, or both of the two nodes may be slave nodes. In other words, a plurality of clock offsets may include a clock offset of the master node relative to one or more slave nodes, and may include a clock offset of a slave node relative to the master node or a clock offset of one slave node relative to another slave node.

The two nodes have a directional relationship, and the directional relationship indicates a relative direction. For example, if a first node in the two nodes points to a second node, it indicates that a clock offset of the second node relative to the first node needs to be determined. If one node and the other node are used to represent the two nodes, one node is the first node, and the other node is the second node.

102: The master node determines a first global clock offset of a target slave node relative to the master node based on the plurality of local clock offsets.

Any slave node in the distributed system may be the target slave node, that is, the master node determines a global clock offset of each slave node relative to the master node.

103: The master node sends the first global clock offset to the target slave node, and correspondingly, the target slave node receives the first global clock offset that is of the target slave node relative to the master node and that is sent by the master node.

104: The target slave node obtains a clock reference value, where the clock reference value indicates a local clock of the target slave node.

105: The target slave node performs clock synchronization based on the clock reference value and the first global clock offset.

In step 105, clock synchronization is performed, and a synchronization clock may be obtained.

The synchronization clock is a calibrated local clock, indicating the actual local time of the node.

Step 105 may be: Add the clock reference value and the first global clock offset to obtain the synchronization clock, and then update the local clock of the target slave node by using the synchronization clock, to implement clock synchronization.

According to the clock synchronization solution provided in this embodiment of this application, the master node may determine the global clock offset between each slave node and the master node based on the plurality of clock offsets between two nodes. In this way, compared with a case in which each node in the distributed system can perform clock synchronization only based on a local clock offset, global error equalization can be implemented by determining the global clock offset by the master node. This helps improve clock synchronization precision of each node. Clock synchronization precision in this application can reach 1 microsecond (µs).

Optionally, the two nodes having a directional relationship may be located on a linearly independent loop, and the linearly independent loop is included in a topology of the distributed system. Generally, the topology of the distributed system includes at least one linearly independent loop. Each linearly independent loop includes at least three nodes associated according to a clockwise or counterclockwise directional relationship, and every two nodes having a directional relationship in the at least three nodes have one local clock offset. The at least three nodes may include a master node, and other nodes are slave nodes, or the at least three nodes may be all slave nodes.

The at least three nodes associated according to a clockwise or counterclockwise directional relationship means that a directional relationship between each node pair having a directional relationship on a linearly independent loop is in one direction, for example, a node A→a node B→a node C→the node A.

Figure 3:
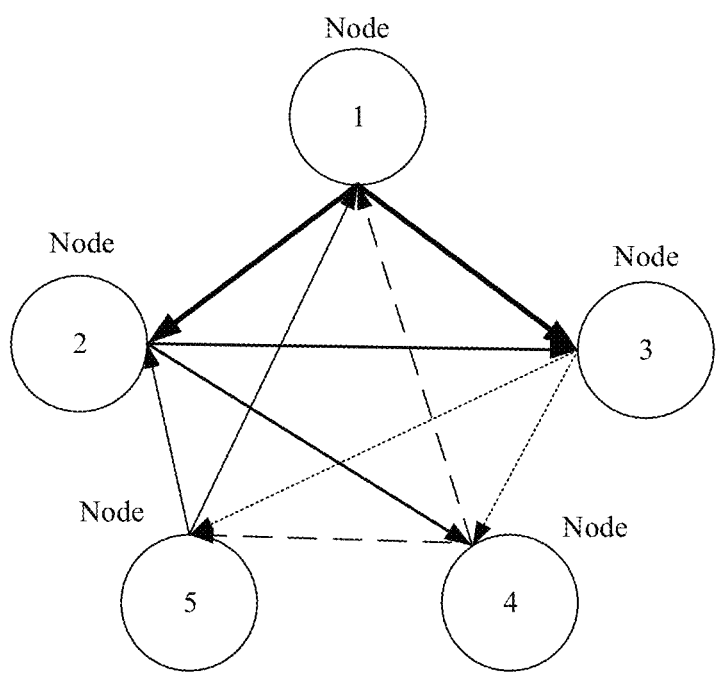
FIG. 3 is a schematic diagram of an example scenario according to an embodiment of this application.

For an example of a linearly independent loop included in the distributed system, refer to FIG. 3 for understanding. In FIG. 3, an example in which a distributed system includes five nodes is used, and each linearly independent loop includes three nodes. In the example shown in FIG. 3, when a master node is being specified, a node 1 may be specified as the master node; or when a master node is being specified, a parameter that K=2 may be input. The parameter indicates that each node in the distributed system may form a linearly independent loop with other two nodes. Certainly, the distributed system is not limited to only five nodes in FIG. 3, and the linearly independent loop is not limited to only three nodes. Herein, the scenario shown in FIG. 3 is used only as an example for description.

The linearly independent loop included in FIG. 3 includes: the node 1→a node 2→a node 4→the node 1, the node 1→a node 3→a node 5→the node 1, the node 1→the node 3→the node 4→the node 1, the node 2→the node 3→the node 5→the node 2, and the node 2→the node 4→the node 5→the node 2. A directional relationship between two nodes on each linearly independent loop is unidirectional, and all nodes on each linearly independent loop form a closed loop in a single direction.

An arrow on the linearly independent loop represents a directional relationship between two nodes. In two nodes having a directional relationship, a node at which an arrow starts sends a probe packet to a node at which the arrow ends, and the node at which the arrow ends sends a response packet to the node at which the arrow starts. Then, the node at which the arrow starts determines a clock offset relationship between the two nodes, and determines a local clock offset of the node at which the arrow ends relative to the node at which the arrow starts. The linearly independent loop: the node 1→the node 2→the node 4 is used as an example. The node 1 sends a probe packet to the node 2, the node 2 sends a response packet to the node 1; the node 2 sends a probe packet to the node 4, the node 4 sends a response packet to the node 2; the node 4 sends a probe packet to the node 1, and the node 1 sends a response packet to node 4.

In this application, a clock offset relationship between two nodes having a directional relationship may be determined based on a probe packet and a response packet, and then a local clock offset between the two nodes are determined based on the clock offset relationship.

The two nodes having the directional relationship are represented by a first node and a second node. In the two nodes, the first node points to the second node, then the first node sends a probe packet to the second node, and the second node sends a response packet to the first node. The first node determines a clock offset relationship between the master node and the second node based on sending time points and receiving time points of a plurality of probe packets and sending time points and receiving time points of the plurality of response packets; and determines a local clock offset of the second node relative to the first node based on the clock offset relationship, where the first node is the master node or the target slave node.

The clock offset relationship is determined based on a plurality of pieces of upper limit data and a plurality of pieces of lower limit data between the first node and the second node. Each piece of upper limit data is a first time difference between a first time point at which the second node receives a probe packet and a second time point at which the first node sends the probe packet. Each piece of lower limit data is a second time difference between a third time point at which the second node sends a response packet and a fourth time point at which the first node receives the response packet, where the response packet corresponds to the probe packet. The clock offset of the first node relative to the second node is determined based on the clock offset relationship, where the first node may be the master node or the target slave node. In embodiments of this application, one of the first node and the second node may be a master node, and the other may be a slave node, or both may be slave nodes.

Figure 4:
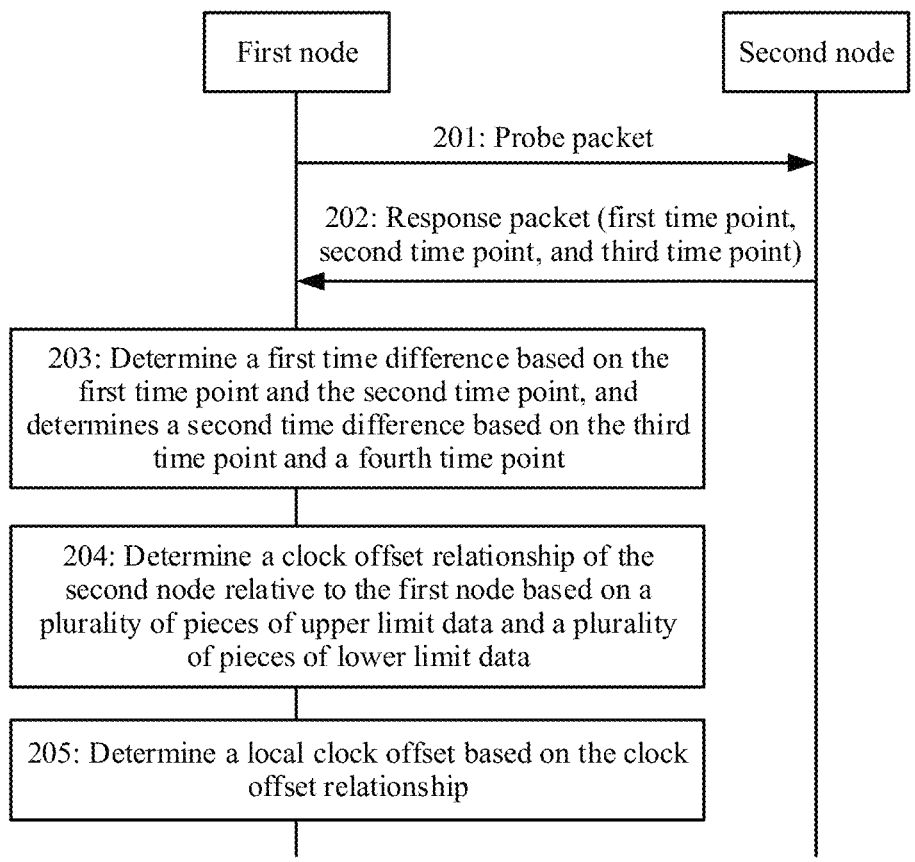
FIG. 4 is a schematic diagram of another embodiment of a clock synchronization method according to embodiments of this application.

A process of determining a clock offset relationship according to embodiments of this application is described below with reference to the accompanying drawings. As shown in FIG. 4, the process includes the following steps.

201: A first node sends a probe packet to a second node. Correspondingly, the second node receives the probe packet.

A time point at which the second node receives the probe packet is a first time point, and a time point at which the first node sends the probe packet is a second time point. The first time point at which the second node receives the probe packet may also be recorded by using a timestamp.

202: The second node sends a response packet. Correspondingly, the first node receives the response packet.

The response packet includes the first time point, the second time point, and a third time point, where the third time point is a time point of sending the response packet. The first time point, the second time point, and the third time point may be carried in a socket option (SO_TIMESTAMPING) in the response packet, and these time points may be obtained by reading the socket option when the response packet is received.

203: The first node determines a first time difference based on the first time point and the second time point, and determines a second time difference based on the third time point and a fourth time point.

The fourth time point is a time at which the first node receives the response packet. The first time difference is a time difference between the first time point and the second time point, and the second time difference is a time difference between the third time point and the fourth time point.

The first time difference is upper limit data, and the second time difference is lower limit data.

Figure 5:
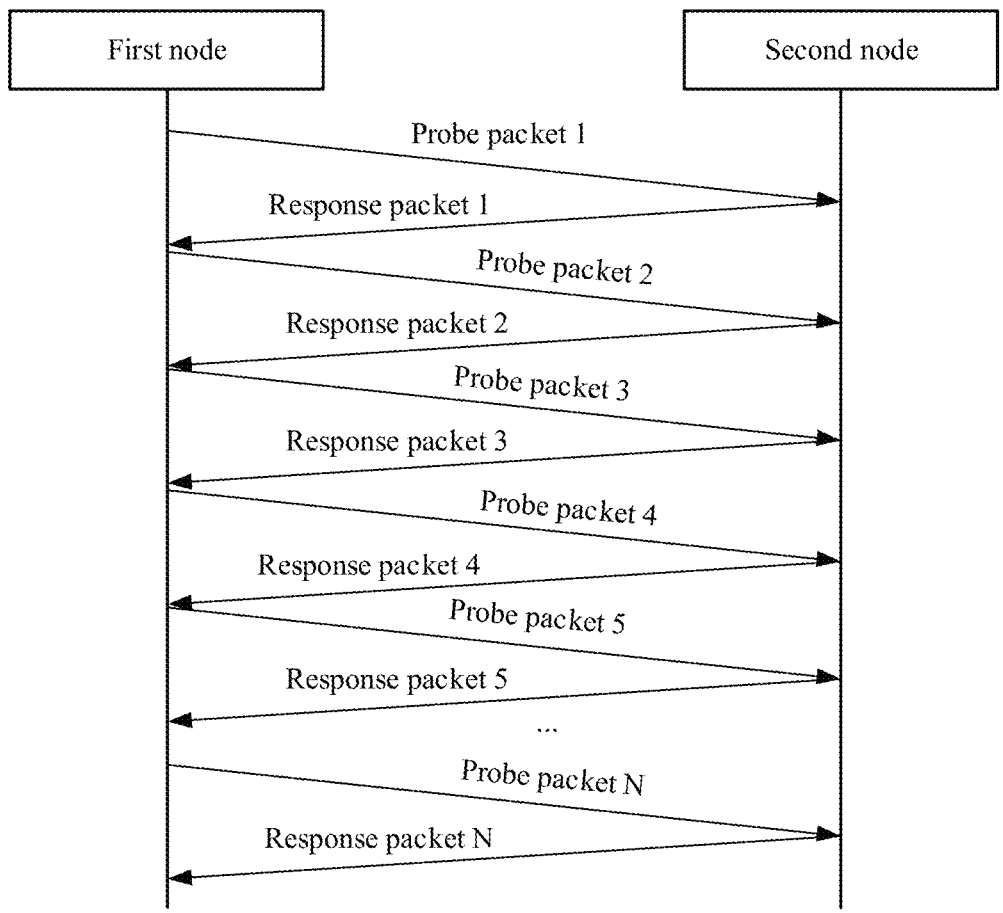
FIG. 5 is a schematic diagram of another embodiment of a clock synchronization method according to embodiments of this application.

A plurality of probe packets may be sent between the first node and the second node at a time, and the second node returns a response packet for each probe packet. As shown in FIG. 5, the first node sends a probe packet 1, a probe packet 2, ..., and a probe packet N at a time, and the second node replies a response packet 1, a response packet 2, ..., and a response packet N, where the probe packet 1 corresponds to the response packet 1, the probe packet 2 corresponds to the response packet 2, and the probe packet N corresponds to the response packet N. A correspondence between a probe packet and a response packet may be established by using an identifier, for example, the probe packet 1 and the response packet 1 have a same identifier.

204: The first node determines a clock offset relationship of the second node relative to the first node based on a plurality of pieces of upper limit data and a plurality of pieces of lower limit data.

Figure 6:
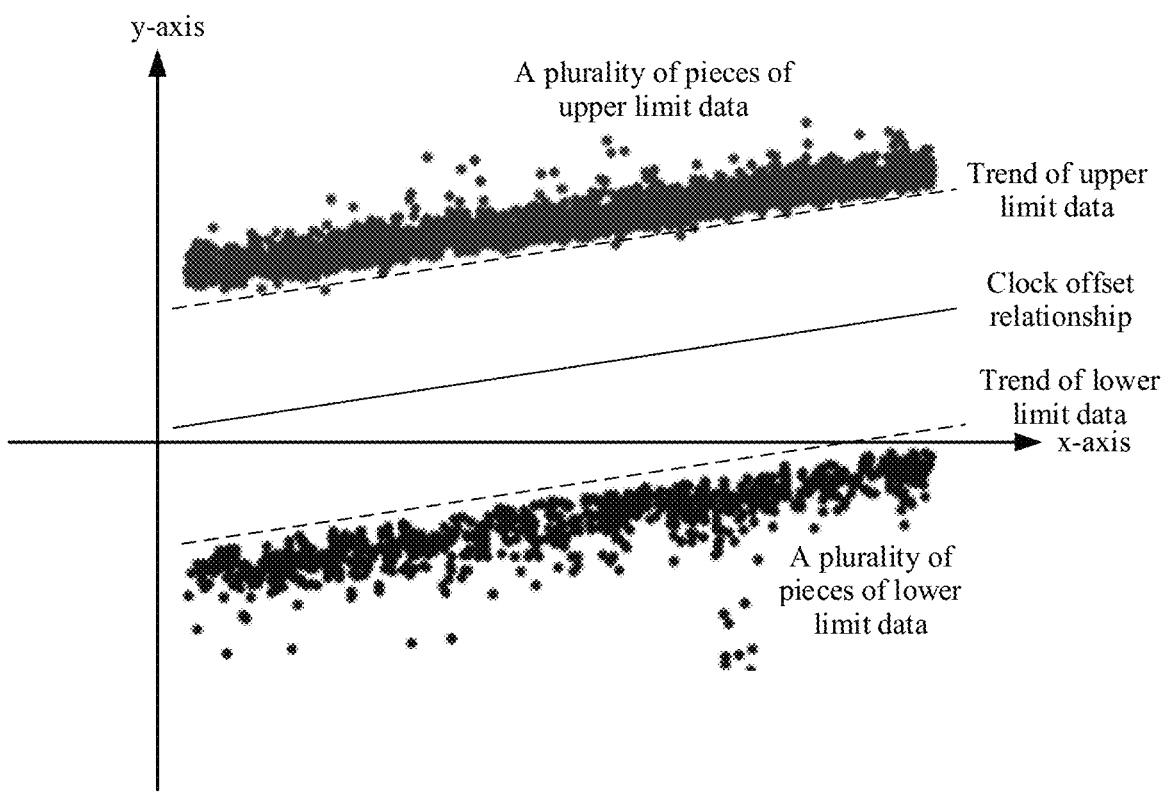
FIG. 6 is a schematic diagram of another example of a clock synchronization method according to embodiments of this application.

Step 204 may be understood with reference to FIG. 6. As shown in FIG. 6, because the first time difference is a receiving time point of the probe packet minus a sending time point, the first time difference is a positive value; because the second time difference is a sending time point of the response packet minus a receiving time point, the second time difference is a negative value. The first time difference and the second time difference are usually symmetrically distributed in a coordinate system. In FIG. 6, each point located on a positive half axis of a y-axis represents one piece of upper limit data, and each point located on a lower half axis of the y-axis represents one piece of lower limit data. It can be seen from FIG. 6 that, both a trend of the upper limit data and a trend of the lower limit data are linearly distributed, and the clock offset relationship of the first node relative to the second node is determined based on a middle position of the trend of the upper limit data and the trend of the lower limit data. The clock offset relationship may be expressed by using the following relational expression: $y=b+kx$, where b represents an intercept, k represents a slope, x represents a time length, for example, 1 second, 0.5 second, or other time, and y represents a clock offset corresponding to the time length x.

205: The first node determines a local clock offset based on the clock offset relationship.

In $y=b+kx$, b and k are both known values, and x is an input value configured based on a requirement. If x is known, the local clock offset y can be calculated.

In this embodiment of this application, a clock offset relationship between two nodes may be determined based on upper limit data and lower limit data, to determine a local clock offset of the two nodes. The clock offset between two nodes is for determining a global clock offset. This improves clock synchronization precision.

In addition, it should be noted that a clock synchronization process in this application is continuously performed, and probe packets and response packets between two nodes are also continuously sent. Therefore, in this application, latest upper limit data and latest lower limit data are determined based on time points in a latest probe packet and a response packet, to update the clock offset relationship. Because a large amount of upper limit data and lower limit data need to be used for determining the clock offset relationship, the process may also be understood as a process of machine learning, and a linear relationship is obtained based on a large amount of data, and the linear relationship may be updated based on the latest upper limit data and lower limit data.

Considering that a transmission exception may occur during network transmission, there may be a probe packet that is suitable for determining the clock offset relationship. Therefore, this embodiment of this application further provides a corresponding filtering solution.

Optionally, a process of filtering the probe packet includes: The first node sends a plurality of follow-up packets within a first preset time interval after sending a plurality of probe packets, where the plurality of follow-up packets are in a one-to-one correspondence with the plurality of probe packets. This may alternatively be described as: an interval between a sending time point of each probe packet and a sending time point of a follow-up packet corresponding to the probe packet is within the first preset time interval. The first node determines at least one target probe packet from the plurality of probe packets, where an interval between a receiving time point at which the second node receives the at least one target probe packet and a receiving time point at which the second node receives a follow-up packet corresponding to the at least one target probe packet is within a second preset time interval. The first node determines the clock offset relationship between the first node and the second node based on the sending time point and a receiving time point of the at least one target probe packet and a sending time point and a receiving time point of a response packet corresponding to the at least one target probe packet. The first node determines a local clock offset of the second node relative to the first node based on the clock offset relationship. The second preset time interval may be less than or equal to the first preset time interval.

Figure 7:
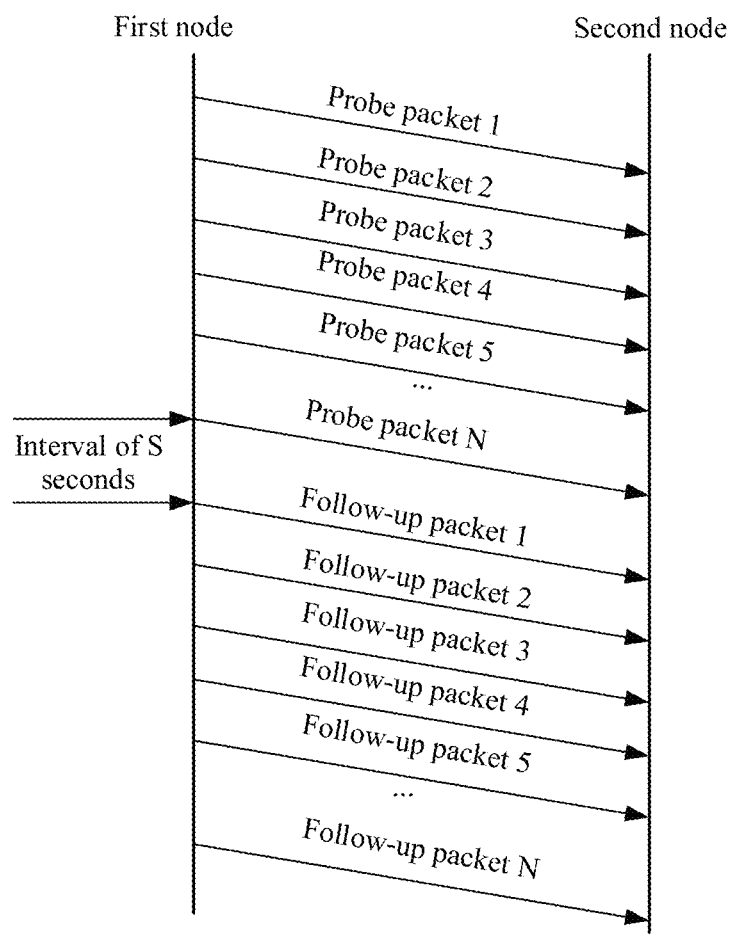
FIG. 7 is a schematic diagram of another embodiment of a clock synchronization method according to embodiments of this application.

The filtering process may also be described as follows: The first node sends a follow-up packet for each probe packet at a first preset time interval after a plurality of probe packets are sent together. As shown in FIG. 7, a follow-up packet 1 is sent for a probe packet 1 after an interval of S seconds, a follow-up packet 2 is sent for a probe packet 2 after an interval of S seconds, . . . , and a follow-up packet N is sent for a probe packet N after an interval of S seconds. A correspondence between a probe packet and a follow-up packet may be associated by having a same identifier.

The first node determines, based on a time interval between receiving a first probe packet and receiving a first follow-up packet by the second node, whether the corresponding first probe packet is used in determining the clock offset relationship, where the first probe packet is any one of the plurality of probe packets, and the first follow-up packet corresponds to the first probe packet. Alternatively, a first follow-up packet may correspond to one first response packet. The first response packet may include a time point at which the second node receives the first follow-up packet. In this way, the first node may determine, based on the time point at which the second node receives the first follow-up packet and a time point at which the second node receives the first probe packet, a time interval between receiving the first probe packet and receiving the first follow-up packet by the second node.

If the time interval is within a time range including a preset time interval, the first node determines that the first probe packet is used in determining the clock offset relationship. If the preset time interval is represented by, for example, S seconds, the time range including the preset time interval may be represented as [S−a, S+a], where a may be a preset value. If the time interval is within the range of [S−a, S+a], the first probe packet is valid, and can be used in determining the clock offset relationship.

If the time interval is beyond a time range including a preset time interval, the first node filters out the first probe packet. If the time interval is beyond the range of [S−a, S+a], the first probe packet is invalid, cannot be used in determining the clock offset relationship, and needs to be filtered out.

This application is not limited to the foregoing filter condition, and may alternatively be: after sending a plurality of probe packets, the first node sends one follow-up packet for each probe packet at a preset time interval. Then, whether a corresponding first probe packet is used in determining the clock offset relationship is determined based on a difference between a third time difference and a first time difference, where the third time difference is a difference between a fifth time point at which the second node receives a first follow-up packet and a sixth time point at which the first node sends the first follow-up packet, the first probe packet is any one of the plurality of probe packets, and the first follow-up packet corresponds to the first probe packet. The first follow-up packet may alternatively correspond to one first response packet, and the first response packet may include the fifth time point at which the second node receives the first follow-up packet.

If a difference between the third time difference and the first time difference is within a threshold range, the first node determines that the first probe packet is used in determining the clock offset relationship.

If a difference between the third time difference and the first time difference is beyond the threshold range, the first probe packet is invalid and cannot be used in determining the clock offset relationship, and the first node needs to filter out the first probe packet.

In this possible implementation, whether the first probe packet is valid may be determined by comparing a time difference between transmission of the first probe packet from one node to another node and a time difference between transmission of the first follow-up packet from the one node to the another node. If the difference between the third time difference and the first time difference is within the threshold range, for example, within [−a, a], it indicates that this network is normal, and the first probe packet is valid and can be used in determining the clock offset relationship. If the difference between the third time difference and the first time difference is beyond the threshold range, for example, not in [−a, a], it indicates that this network is abnormal, the first probe packet is invalid and cannot be used in determining the clock offset relationship, and the first probe packet needs to be filtered out. a may be a preset small value.

If probe packets are sent in a group, for example, 100 probe packets are sent in one group, and if a quantity of invalid probe packets in the group exceeds a preset quantity, the group of probe packets may also be discarded. If a quantity of invalid probe packets in this group is less than the preset quantity, the invalid probe packets may be filtered out, and other packets may be used in determining the clock offset relationship.

A local clock offset of the second node relative to the first node may be obtained according to the foregoing solution. Two nodes having a directional relationship on the linear foregoing independent loop can both obtain one local clock offset. In this way, the master node in the distributed system can obtain a plurality of local clock offsets. Then, the master node corrects the plurality of local clock offsets to obtain a plurality of corrected local clock offsets, where a sum of the plurality of corrected local clock offsets is equal to 0. The plurality of corrected local clock offsets include a second global clock offset of the first slave node relative to the master node. The first slave node has a direct pointing relationship with the master node, the target slave node is the first slave node, and the second global clock offset is a first global clock offset.

Alternatively, a clock offset relationship between a second slave node and the master node is determined based on a clock offset relationship between the first slave node and the master node and a clock offset relationship between the second slave node and the first master node, where the second slave node has no direct directional relationship with the master node. A third global clock offset of the second slave node relative to the master node is determined based on the clock offset relationship between the second slave node and the master node, where the target slave node is the second slave node, and the third global clock offset is the first global clock offset.

The correction process may also be described as follows: Then, the master node corrects a plurality of clock offsets with a goal that a sum of local clock offsets of at least three node pairs included in each linearly independent loop is equal to 0, to obtain a plurality of corrected local clock offsets. The plurality of corrected local clock offsets include a global clock offset of the first slave node that has a direct directional relationship with the master node. For a second slave node that has no direct directional relationship with the master node, a global clock offset of the second slave node relative to the master node is determined by using a clock offset relationship of the first slave node that has the direct directional relationship with the master node and a clock offset relationship between the first slave node and the second slave node. The first global clock offset is included in the global clock offset of the first slave node that has the direct directional relationship with the master node and the global clock offset of the second slave node relative to the master node. In this embodiment of this application, the first slave node and the second slave node may be same nodes as the first node and the second node. Herein, the first slave node and the second slave node are used for differentiation only to indicate that the two nodes are not master nodes in this scenario.

For example, the node 1 on the linearly independent loop shown in FIG. 3 may obtain a clock offset 1 of the node 2 relative to the node 1 and a clock offset 2 of the node 3 relative to the node 1. The node 2 may obtain a clock offset 3 of the node 3 relative to the node 2, and a clock offset 4 of the node 4 relative to the node 2. The node 3 may obtain a clock offset 5 of the node 4 relative to the node 3 and a clock offset 6 of the node 5 relative to the node 3. The node 4 may obtain a clock offset 7 of the node 1 relative to the node 4, and a clock offset 8 of the node 5 relative to the node 4. The node 5 may obtain a clock offset 9 of the node 1 relative to the node 5, and a clock offset 10 of the node 2 relative to the node 5.

It should be noted that the clock offset 1 to the clock offset 10 listed herein are all local clock offsets.

For a relationship between the foregoing nodes and the clock offsets, refer to Table 1 for understanding.

TABLE 1

Table of a correspondence between clock offsets and directional relationships between node pairs

| Directional relationship between a node pair | Clock offset |
| --- | --- |
| Node 1 -> Node 2 | Clock offset 1 |
| Node 1 -> Node 3 | Clock offset 2 |
| Node 2 -> Node 3 | Clock offset 3 |
| Node 2 -> Node 4 | Clock offset 4 |
| Node 3 -> Node 4 | Clock offset 5 |
| Node 3 -> Node 5 | Clock offset 6 |
| Node 4 -> Node 1 | Clock offset 7 |
| Node 4 -> Node 5 | Clock offset 8 |
| Node 5 -> Node 1 | Clock offset 9 |
| Node 5 -> Node 2 | Clock offset 10 |

In the scenario example shown in FIG. 3, the master node (the node 1) may obtain the 10 clock offsets in Table 1. Then, three clock offsets that belong to a same linearly independent loop are written in one row. In FIG. 3, there are five linearly independent loops, and a matrix of five rows and three columns may be written. For a correspondence between the five rows and three columns of clock offsets and the linearly independent loops, refer to Table 2 for understanding.

TABLE 2

Correspondence between five rows and three columns of clock offsets and linearly independent loops

| Linearly independent loop | First column | Second column | Third column |
|---|---|---|---|
| Node 1 -> Node 2 -> Node 4 -> Node 1 | Clock offset 1 | Clock offset 4 | Clock offset 7 |
| Node 1 -> Node 3 -> Node 5 -> Node 1 | Clock offset 2 | Clock offset 6 | Clock offset 9 |
| Node 1 -> Node 3 -> Node 4 -> Node 1 | Clock offset 2 | Clock offset 5 | Clock offset 7 |
| Node 2 -> Node 3 -> Node 5 -> Node 2 | Clock offset 3 | Clock offset 6 | Clock offset 10 |
| Node 2 -> Node 4 -> Node 5 -> Node 2 | Clock offset 4 | Clock offset 8 | Clock offset 10 |

A calculation method of a minimum normal form solution is used. The matrix is calculated with a goal that a sum of three clock offsets in the first column, the second column, and the third column in each row of the foregoing Table 1 is equal to 0, to obtain 10 corrected clock offsets. The 10 corrected clock offsets may be understood with reference to Table 3.

TABLE 3

Table of a correspondence between corrected clock offsets and directional relationships between node pairs

| Directional relationship between a node pair | Clock offset |
|---|---|
| Node 1 -> Node 2 | Clock offset 1' |
| Node 1 -> Node 3 | Clock offset 2' |
| Node 2 -> Node 3 | Clock offset 3' |
| Node 2 -> Node 4 | Clock offset 4' |
| Node 3 -> Node 4 | Clock offset 5' |
| Node 3 -> Node 5 | Clock offset 6' |
| Node 4 -> Node 1 | Clock offset 7' |
| Node 4 -> Node 5 | Clock offset 8' |
| Node 5 -> Node 1 | Clock offset 9' |
| Node 5 -> Node 2 | Clock offset 10' |

In this scenario, the node 1 is a master node. Therefore, an opposite value of the clock offset 7' is a global clock offset of the node 4 (slave node) relative to the node 1 (master node), and an opposite value of the clock offset 9' is a global clock offset of the node 5 (slave node) relative to the node 1 (master node). The clock offset 1' is a global clock offset of the node 2 (slave node) relative to the node 1 (master node), and the clock offset 2' is a global clock offset of the node 3 (slave node) relative to the node 1 (master node).

In this scenario, the node 2, the node 3, the node 4, and the node 5 that are used as slave nodes each have a direct directional relationship with the node 1 that is used as the master node. If the node 6 further exists, the node 6 is located on a linearly independent loop of the node 5→the node 2→the node 6→the node 5. A global clock offset of the node 6 relative to the node 1 may be determined by using a clock offset relationship of the node 6→node 5 and a clock offset relationship of the node 5→node 1. A clock offset relationship of the node 6 relative to the node 1 is determined. Then, the global clock offset of the node 6 relative to the node 1 is determined based on the clock offset relationship of the node 6 relative to the node 1. The process in which the node 6 that has no direct directional relationship with the master node determines the clock offset relationship by using the node 5 that has a direct directional relationship with the master node may also be referred to as "rumor propagation". Herein, only the node 6 is used to represent "rumor propagation". If the distributed system includes a large quantity of nodes, a plurality of indirect relationships may be required for associating with a slave node that has a direct relationship with the master node. The principle of "rumor propagation" remains the same regardless of whether one or more indirect relationships are required for implementing the above process.

For ease of understanding, the following describes a foregoing process of correcting a plurality of clock offsets by using an example in which the distributed system includes a node A, a node B, and a node C, and the three nodes form a linearly independent loop. The distributed system includes the three nodes. A local clock offset A of the node A relative to the node B is 10, a local clock offset B of the node B relative to the node C is 5, and a local clock offset C of the node C relative to the node A is −14. To make the local clock offset A+the local clock offset B+the local clock offset C=0, an error equalization manner may be used. For example, an error of the linearly independent loop is 10+5+(−14)=1. If the error is equally allocated to the three nodes, an equalized error is $\frac{1}{3}$. In this case, corrected local clock offsets are: a local clock offset A'=10+$\frac{1}{3}$, a local clock offset B'=5+$\frac{1}{3}$, and a local clock offset C'=(−14)+$\frac{1}{3}$.

Optionally, step 104 may include: Obtain the clock reference value from a register of a processor, where the clock reference value is synchronized by a network adapter device of the target slave node to the register of the processor over a physical link between the network adapter device and the processor.

In this embodiment of this application, the network adapter device (network adapter) synchronizes the obtained clock reference value to the processor in time. In this way, when clock synchronization is implemented by using software, the processor runs a program used for clock synchronization. The processor can obtain the clock reference value from the register of the processor, and does not need to obtain the clock reference value from a network adapter clock device. This improves a clock synchronization speed.

Figure 8:
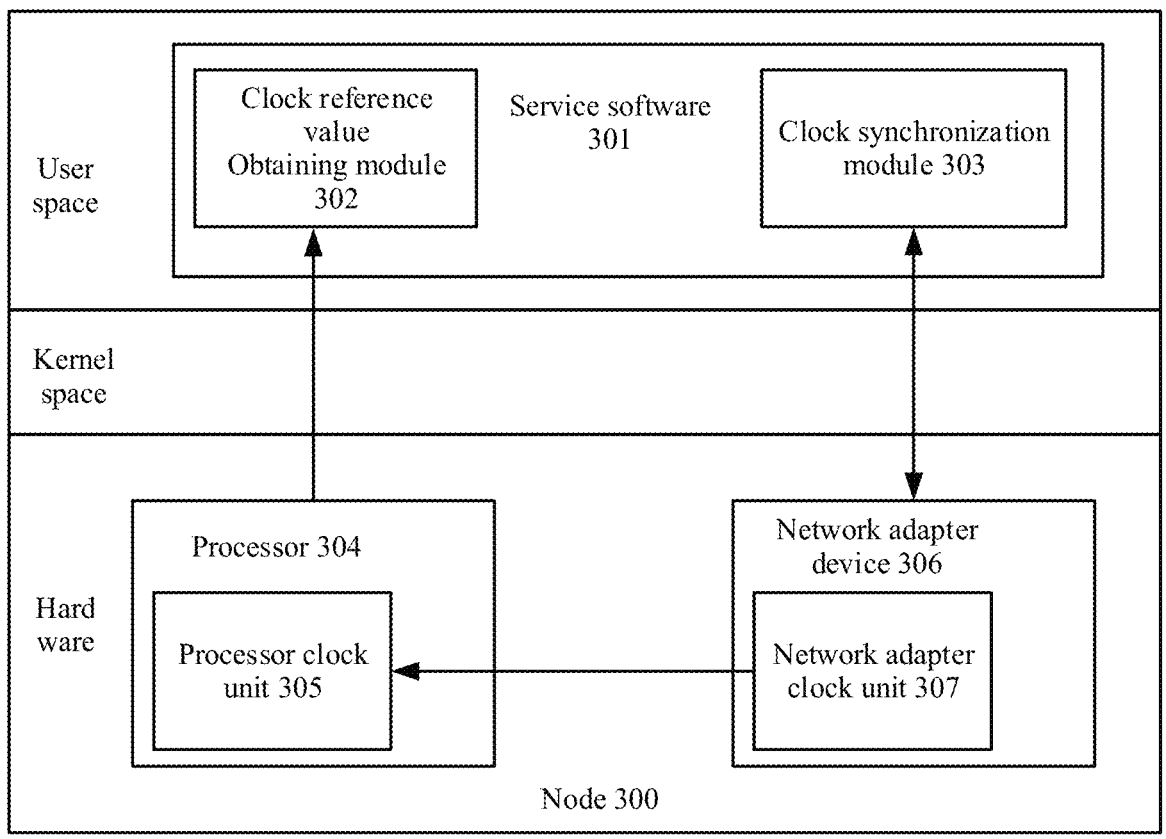
FIG. 8 is a schematic diagram of a structure of a node in a distributed system according to an embodiment of this application.

The nodes of the distributed system provided in this embodiment of this application are improved in both software and hardware. For corresponding content, refer to FIG. 8 for understanding. As shown in FIG. 8, a node 300 includes hardware, a kernel space (kernel space), and a user space (user space). A service software 301 runs in the user space, and the service software 301 includes a clock reference value obtaining module 302 and a machine learning-based clock synchronization module 303. Hardware involved in this embodiment includes a processor 304 and a network adapter device 306. The processor 304 includes a processor clock unit 305. The processor clock unit 305 may be an on-chip memory of the processor 304, for example, a register, configured to store a processor clock. The network adapter device 306 includes a network adapter clock unit 307. The network adapter clock unit 307 may be a memory of the network adapter device 306, and is configured to store a physical clock of the network adapter device 306. The processor clock unit 305, the processor 304, and the network adapter device 306 each further include a processing circuit, an interface circuit, and the like that are configured to implement respective functions. The service software 301 is in the user space, and the clock reference value obtaining module 302 and the clock synchronization module 303 may exchange information with the processor 304 and the network adapter device 306 through a kernel. For example, the clock reference value obtaining module 302 may access the kernel space by using a system call (system call), a library function, or a shell script, and further exchange information with hardware by using a kernel space component (such as a hardware driver), for example, obtain a clock in the processor clock unit 305 as the clock reference value. According to the node 300 provided in this embodiment of this application, a physical link is established between the processor clock unit 305 and the network adapter clock unit 307, and a frequency and a reference value of the physical clock of the network adapter device are sent to the processor clock unit 305 in real time.

The network adapter device 306 is configured to send the probe packet and the follow-up packet in the foregoing embodiment, and receive the response packet. The network adapter device 306 has a function of timestamping. The network adapter device 306 may transfer the first time, the second time, the third time, and the fourth time in the foregoing embodiment to the machine learning-based clock synchronization module 303. Then, the machine learning-based clock synchronization module 303 may calculate the first time difference and the second time difference in the foregoing embodiment, and obtain a clock offset relationship between two nodes based on a plurality of pieces of obtained upper limit data and lower limit data, to calculate a local clock offset of the two nodes. The network adapter device 306 on a slave node is further configured to send the clock offset to a master node, and receive a global clock offset sent by the master node. The network adapter clock unit 307 is configured to obtain a local clock, namely, a clock reference value of the node. The network adapter clock unit 307 synchronizes the clock reference value to the processor clock unit 305. The clock reference value obtaining module 302 may obtain the clock reference value of the node from the processor 304. Then, the clock reference value obtaining module 302 may calculate a synchronization clock based on the clock reference value and the global clock offset.

Figure 9:
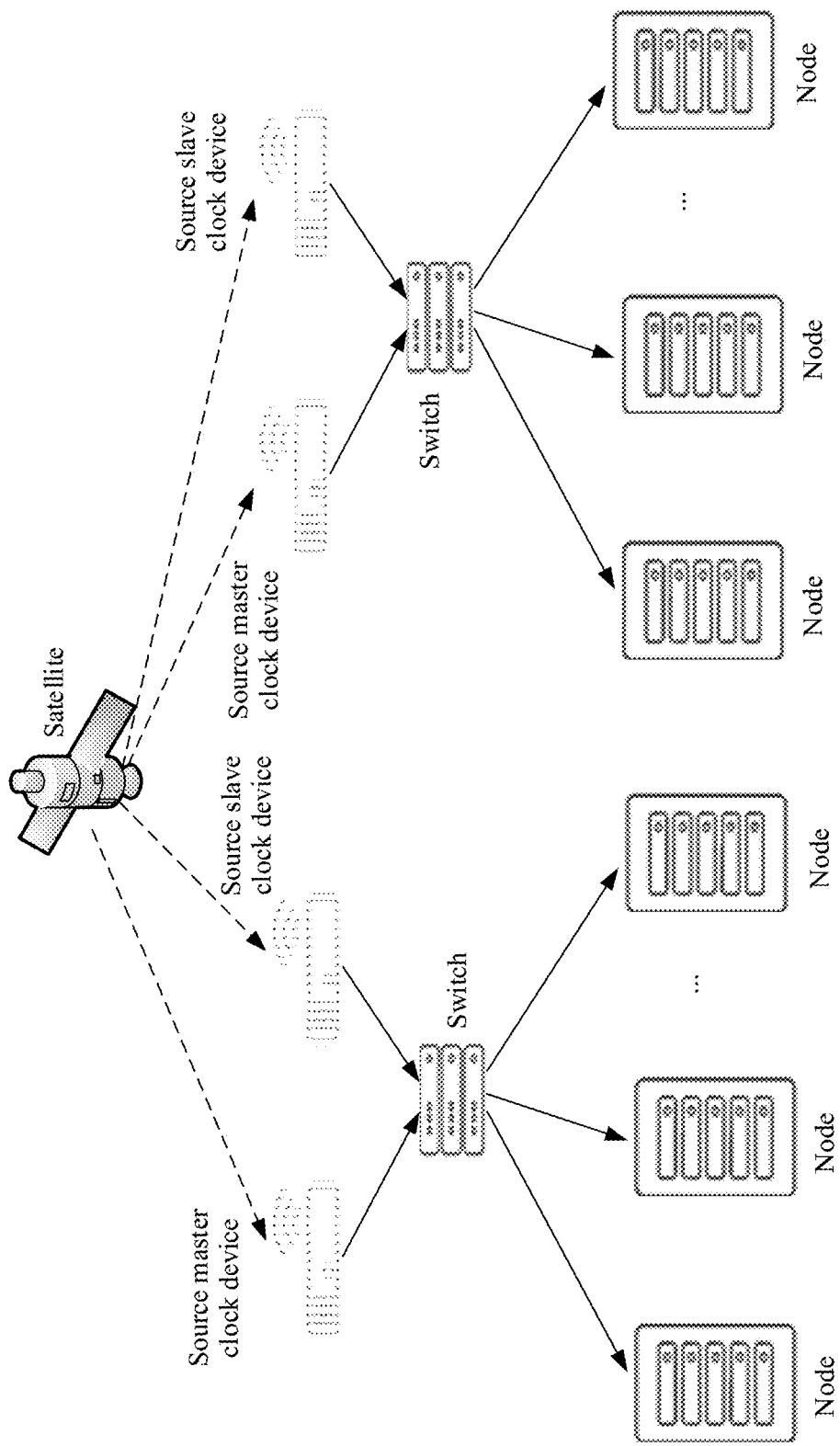
FIG. 9 is a schematic diagram of a global clock synchronization scenario according to an embodiment of this application.

The foregoing embodiment is described from the perspective of the distributed system. As shown in FIG. 9, a source master clock device and a source slave clock device in this embodiment of this application may obtain a satellite clock from a satellite. Source master clock devices and source slave clock devices in different distributed systems may all obtain a satellite clock from the satellite. In this way, global clock synchronization can be implemented.

The foregoing describes the distributed system and the clock synchronization method. The following describes a clock synchronization apparatus provided in embodiments of this application with reference to the accompanying drawings.

Figure 10:
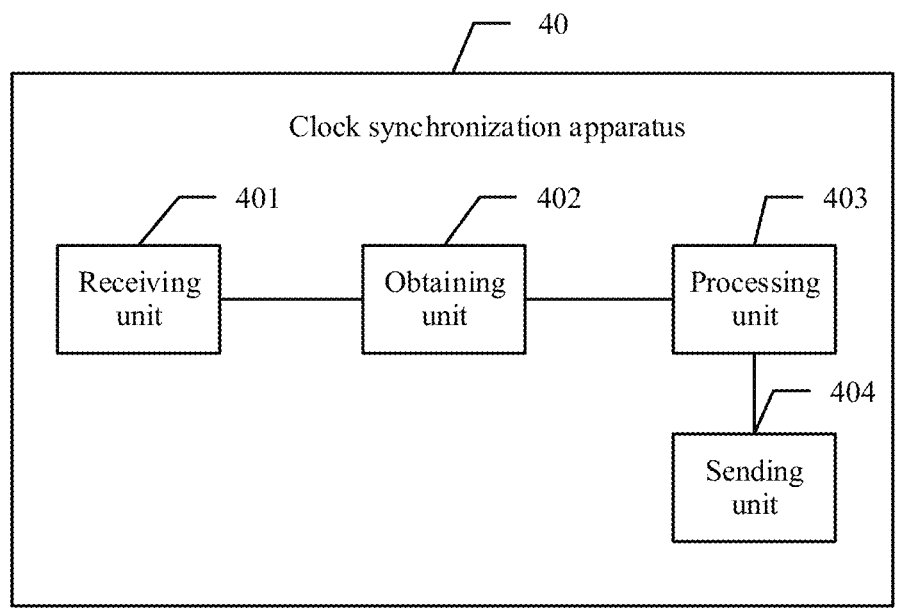
FIG. 10 is a schematic diagram of an embodiment of a clock synchronization apparatus according to an embodiment of this application.

As shown in FIG. 10, an embodiment of a clock synchronization apparatus 40 in a distributed system according to an embodiment of this application. The distributed system includes a plurality of nodes, the plurality of nodes include a master node and a plurality of slave nodes, and the clock synchronization apparatus 40 includes:

a receiving unit 401, configured to obtain a global clock offset sent by the master node, where the global clock offset indicates a clock offset of the target slave node relative to the master node, the global clock offset is determined based on a plurality of local clock offsets, and each of the plurality of local clock offsets indicates a clock offset between two nodes in the distributed system;

an obtaining unit 402, configured to obtain a clock reference value, where the clock reference value indicates a local clock of the target slave node; and a processing unit 403, configured to perform clock synchronization based on the clock reference value and the first global clock offset.

In this embodiment of this application, the slave node may perform clock synchronization based on the global clock offset sent by the master node. Because the global clock offset is obtained by the master node through global error equalization, compared with a case in which each node in the distributed system can perform clock synchronization only based on a local clock offset, in this application, clock synchronization precision of each node is improved. Clock synchronization precision in this application can reach 1 microsecond (µs).

Optionally, the obtaining unit 402 is configured to: when the processor runs a program used for clock synchronization, obtain the clock reference value from a register of a processor, where the clock reference value is synchronized by a network adapter device of the target slave node to the register over a physical link between the network adapter device and the processor.

Optionally, the plurality of local clock offsets include a local clock offset of another node relative to the target slave node, and the sending unit 404 is configured to send a plurality of probe packets to the another node.

The receiving unit 401 is configured to receive a plurality of response packets corresponding to the plurality of probe packets sent by the another node, where the plurality of probe packets are in a one-to-one correspondence with the plurality of response packets.

The processing unit 403 is configured to: determine a clock offset relationship between the target slave node and the another node based on sending time points and receiving time points of the plurality of probe packets and sending time points and receiving time points of the plurality of response packets; and determine the local clock offset of the another node relative to the target slave node based on the clock offset relationship.

Optionally, the plurality of local clock offsets include a local clock offset of another node relative to the target slave node, and the sending unit 404 is further configured to send a plurality of probe packets to the another node.

The receiving unit 401 is configured to receive a plurality of response packets corresponding to the plurality of probe packets sent by the another node, where the plurality of probe packets are in a one-to-one correspondence with the plurality of response packets.

The sending unit 404 is further configured to send a plurality of follow-up packets, where the plurality of follow-up packets are in a one-to-one correspondence with the plurality of probe packets, and an interval between a sending time point of each probe packet and a sending time point of a follow-up packet corresponding to the probe packet is within a first preset time interval.

The processing unit 403 is further configured to: determine at least one target probe packet from the plurality of probe packets, where an interval between a receiving time point at which the another node receives the at least one target probe packet and a receiving time point at which the another node receives a follow-up packet corresponding to the at least one target probe packet is within a second preset time interval; determine a clock offset relationship between the target slave node and the another node based on a sending time point and the receiving time point of the at least one target probe packet and a sending time point and a receiving time point of a response packet corresponding to the at least one target probe packet; determine a local clock offset of the another node relative to the target slave node based on the clock offset relationship.

For related content of the clock synchronization apparatus 40 provided above, refer to related content of the target slave node in the foregoing clock synchronization method embodiments for understanding. Details are not described herein again.

Figure 11:
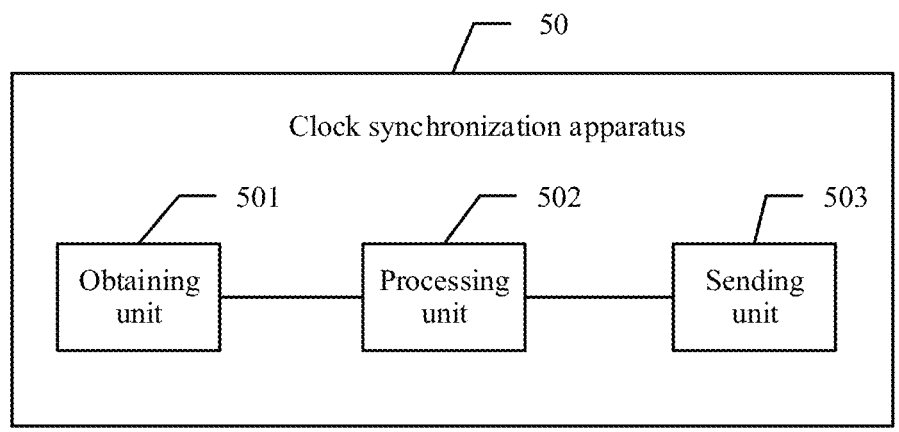
FIG. 11 is a schematic diagram of another embodiment of a clock synchronization apparatus according to an embodiment of this application.

FIG. 11 shows a clock synchronization apparatus 50 in a distributed system according to an embodiment of this application. The distributed system includes a plurality of nodes, the plurality of nodes include a master node and a plurality of slave nodes, and an embodiment of the clock synchronization apparatus includes:

an obtaining unit 501, configured to obtain a plurality of local clock offsets, where each of the plurality of local clock offsets indicates a clock offset between two nodes in the distributed system;

a processing unit 502, configured to determine a first global clock offset of a target slave node in the plurality of slave nodes relative to the master node based on the plurality of local clock offsets of the obtaining unit; and a sending unit 503, configured to send the first global clock offset to the target slave node, where the first global clock offset is used by the target slave node to perform clock synchronization.

According to the solution provided in this application, the master node may determine the global clock offset between each slave node and the master node based on the plurality of clock offsets between two nodes. In this way, compared with a case in which each node in the distributed system can perform clock synchronization only based on a local clock offset, in this application, global error equalization can be implemented by determining the global clock offset by the master node. This helps improve clock synchronization precision of each node. Clock synchronization precision in this application can reach 1 microsecond (μs).

Optionally, a topology diagram of the distributed system includes at least one linearly independent loop, each linearly independent loop includes at least three nodes associated based on a clockwise or counterclockwise directional relationship, every two of the at least three nodes having a directional relationship have one local clock offset, and the at least three nodes include the master node, or the at least three nodes are all slave nodes.

Optionally, the plurality of local clock offsets include a local clock offset of another node relative to the master node, and the sending unit 503 is further configured to send a plurality of probe packets to the another node.

The obtaining unit 501 is further configured to receive a plurality of response packets corresponding to the plurality of probe packets sent by the another node, where the plurality of probe packets are in a one-to-one correspondence with the plurality of response packets.

The processing unit 502 is further configured to: determine a clock offset relationship between the master node and the another node based on sending time points and receiving time points of the plurality of probe packets and sending time points and receiving time points of the plurality of response packets; and determine the local clock offset of the another node relative to the master node based on the clock offset relationship.

Optionally, the plurality of local clock offsets include a local clock offset of another node relative to the master node, and the sending unit 503 is further configured to send a plurality of probe packets to the another node.

The obtaining unit 501 is further configured to receive a plurality of response packets corresponding to the plurality of probe packets sent by the another node, where the plurality of probe packets are in a one-to-one correspondence with the plurality of response packets.

The sending unit 503 is further configured to send a plurality of follow-up packets, where the plurality of follow-up packets are in a one-to-one correspondence with the plurality of probe packets, and an interval between a sending time point of each probe packet and a sending time point of a follow-up packet corresponding to the probe packet is within a first preset time interval.

The processing unit 502 is further configured to: determine at least one target probe packet from the plurality of probe packets, where an interval between a receiving time point at which the another node receives the at least one target probe packet and a receiving time point at which the another node receives a follow-up packet corresponding to the at least one target probe packet is within a second preset time interval; determine a clock offset relationship between the master node and the another node based on a sending time point and the receiving time point of the at least one target probe packet and a sending time point and a receiving time point of a response packet corresponding to the at least one target probe packet; determine a local clock offset of the another node relative to the master node based on the clock offset relationship.

Optionally, the processing unit 502 is configured to correct the plurality of local clock offsets to obtain a plurality of corrected local clock offsets, where a sum of the plurality of corrected local clock offsets is equal to 0. The plurality of corrected local clock offsets include a second global clock offset of the first slave node relative to the master node. The first slave node has a direct pointing relationship with the master node, the target slave node is the first slave node, and the second global clock offset is a first global clock offset.

The processing unit 502 is configured to determine a clock offset relationship between a second slave node and the master node based on a clock offset relationship between the first slave node and the master node and a clock offset relationship between the second slave node and the first master node, where the first slave node has a direct directional relationship with the master node, and the second slave node has no direct directional relationship with the master node; and determine a third global clock offset of the second slave node relative to the master node based on the clock offset relationship between the second slave node and the master node, where the target slave node is the second slave node, and the first global clock offset is the third global clock offset.

Optionally, a clock source of the master node is from a satellite clock.

For related content of the clock synchronization apparatus 50 provided above, refer to related content of the master node in the foregoing clock synchronization method embodiments for understanding. Details are not described herein again.

Figure 12:
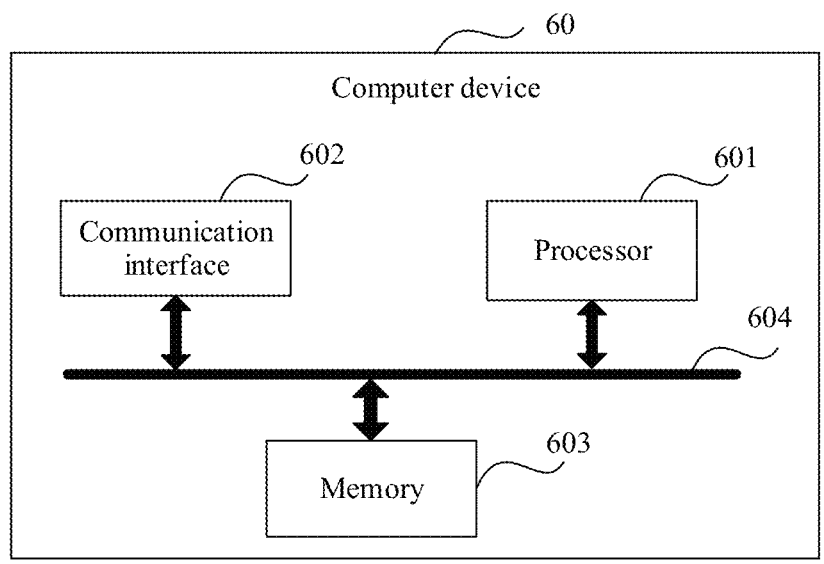
FIG. 12 is a schematic diagram of an embodiment of a computer device according to embodiments of this application.

FIG. 12 is a possible schematic diagram of a logical structure of a computer device 60 in the foregoing embodiment according to an embodiment of this application. The computer device 60 may be a clock synchronization apparatus. The computer device 60 includes a processor 601, a communication interface 602, a memory 603, and a bus 604. The processor 601, the communication interface 602, and the memory 603 are connected to each other by using the bus 604. In this embodiment of this application, the processor 601 is configured to control and manage an action of the computer device 60. For example, the processor 601 is configured to perform steps related to determining in FIG. 2 to FIG. 8, for example, steps 102, 104, 105, and 203 to 205. The communication interface 602 is configured to support the computer device 60 in performing communication. For example, the communication interface 602 may perform steps related to receiving or sending in the foregoing method embodiments. The memory 603 is configured to store program code and data of a database server.

The processor 601 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 604 may be a peripheral component interconnect (Peripheral Component Interconnect, PCI) bus, an extended industry standard architecture (Extended Industry Standard Architecture, EISA) bus, or the like. Buses may be classified into an address bus, a data bus, a control bus, and the like. For ease of representation, only one thick line is for representing the bus in FIG. 12, but this does not mean that there is only one bus or only one type of bus.

Figure 13:
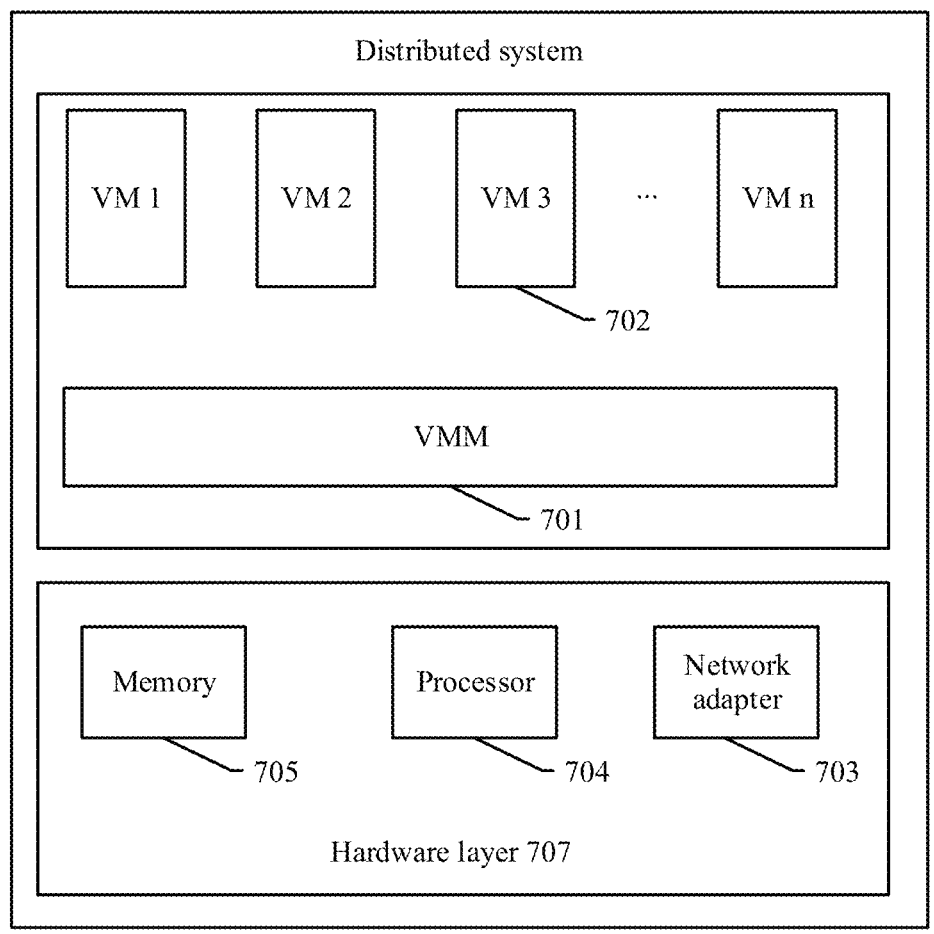
FIG. 13 is a schematic diagram of an embodiment of a distributed system according to embodiments of this application.

Refer to FIG. 13. An embodiment of this application further provides a distributed system, including a hardware layer 707, a virtual machine monitor (VMM) 701 running at the hardware layer 707, and a plurality of virtual machines 702. One virtual machine may be used as a master node in the distributed database system. Other virtual machines are slave nodes.

Specifically, the virtual machine 702 is a virtual computer simulated on a common hardware resource by using virtual machine software. An operating system and an application program may be installed on the virtual machine, and the virtual machine may further access a network resource. For an application running in a virtual machine, the virtual machine works like a real computer.

The hardware layer 707 is a hardware platform for virtual environment running, and may be obtained by abstracting hardware resources of one or more physical machines. The hardware layer may include a plurality of types of hardware, for example, a processor 704 (such as a CPU) and a memory 705, and may further include a network interface card 703 (such as an RDMA network interface card), an input/output (input/output, I/O) device, and another device with a specific processing function.

The virtual machine 702 runs an executable program based on the VMM and a hardware resource provided by the hardware layer 707, to implement some or all functions of the clock synchronization apparatus in the related embodiments in FIG. 2 to FIG. 8. For brevity, details are not described herein again.

Further, the distributed database system may further include a host (Host). The host, serving as a management layer, is configured to manage and allocate hardware resources, present a virtual hardware platform for the virtual machine, and implement scheduling and isolation for the virtual machine. The host may be a virtual machine monitor (VMM) or a combination of a VMM and one privileged virtual machine. The virtual hardware platform provides various hardware resources for each virtual machine running on the virtual hardware platform. For example, the virtual hardware platform provides a virtual processor (such as a VCPU), a virtual memory, a virtual disk, and a virtual network interface card. The virtual disk may correspond to a file or a logical block device of the host. A virtual machine runs on a virtual hardware platform that is prepared by the host for the virtual machine, and one or more virtual machines run on the host. The VCPU of the virtual machine 702 executes an executable program stored in a virtual memory corresponding to the VCPU, to implement or execute the method steps described in the foregoing method embodiments of the present invention. For example, some or all functions of the clock synchronization apparatus in embodiments related to FIG. 2 to FIG. 8 are implemented.

Another embodiment of this application further provides a computer-readable storage medium. The computer-readable storage medium stores computer-executable instructions. When at least one processor of a device executes the computer-executable instructions, the device performs the clock synchronization method described in embodiments in FIG. 2 to FIG. 8.

Another embodiment of this application further provides a computer program product. The computer program product includes computer-executable instructions, and the computer-executable instructions are stored in a computer-readable storage medium. At least one processor of a device may read the computer-executable instructions from the computer-readable storage medium. When the at least one processor executes the computer-executable instructions, the device performs the clock synchronization method described in embodiments in FIG. 2 to FIG. 8.

In another embodiment of this application, a chip system is further provided. The chip system includes a processor, configured to support a time series data injection apparatus or a time series data query apparatus in implementing the clock synchronization method described in embodiments in FIG. 2 to FIG. 8. In a possible design, the chip system may further include a memory. The memory is used for program instructions and data that are necessary for the clock synchronization apparatus. The chip system may include a chip, or may include a chip and another discrete component.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of embodiments of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in embodiments of this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of embodiments of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device, or the like) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

What is claimed is:

1. A clock synchronization method in a distributed system, wherein the distributed system comprises a plurality of nodes, the plurality of nodes comprise a master node and a plurality of slave nodes, and the method comprises:
   obtaining, by a target slave node in the plurality of slave nodes, a global clock offset sent by the master node, wherein the global clock offset indicates a clock offset of the target slave node relative to the master node, the global clock offset is determined based on a plurality of local clock offsets, and each of the plurality of local clock offsets indicates a clock offset between two nodes in the distributed system, the global clock offset is obtained after error equalization is performed on the plurality of local clock offsets;
   obtaining, by the target slave node, a clock reference value, wherein the clock reference value indicates a local clock of the target slave node; and
   performing, by the target slave node, clock synchronization based on the clock reference value and the global clock offset.

2. The method according to claim 1, wherein the obtaining, by the target slave node, a clock reference value comprises:
   obtaining the clock reference value from a register of a processor, wherein the clock reference value is synchronized by a network adapter device of the target slave node to the register over a physical link between the network adapter device and the processor.

3. The method according to claim 1, wherein the plurality of local clock offsets comprise a local clock offset of another node relative to the target slave node, and the method further comprises:
   sending, by the target slave node, a plurality of probe packets to the another node;
   receiving, by the target slave node, a plurality of response packets corresponding to the plurality of probe packets sent by the another node, wherein the plurality of probe packets are in a one-to-one correspondence with the plurality of response packets;
   determining, by the target slave node, a clock offset relationship between the target slave node and the another node based on sending time points and receiving time points of the plurality of probe packets and sending time points and receiving time points of the plurality of response packets; and
   determining, by the target slave node, the local clock offset of the another node relative to the target slave node based on the clock offset relationship.

4. The method according to claim 1, wherein the plurality of local clock offsets comprise a local clock offset of another node relative to the target slave node, and the method further comprises:
   sending, by the target slave node, a plurality of probe packets to the another node;
   receiving, by the target slave node, a plurality of response packets corresponding to the plurality of probe packets sent by the another node, wherein the plurality of probe packets are in a one-to-one correspondence with the plurality of response packets;
   sending, by the target slave node, a plurality of follow-up packets, wherein the plurality of follow-up packets are in a one-to-one correspondence with the plurality of probe packets, and an interval between a sending time point of each probe packet and a sending time point of a follow-up packet corresponding to the probe packet is within a first preset time interval;
   determining, by the target slave node, at least one target probe packet from the plurality of probe packets, wherein an interval between a receiving time point at which the another node receives the at least one target probe packet and a receiving time point at which the another node receives a follow-up packet corresponding to the at least one target probe packet is within a second preset time interval;
   determining, by the target slave node, a clock offset relationship between the target slave node and the another node based on a sending time point and the receiving time point of the at least one target probe packet and a sending time point and a receiving time point of a response packet corresponding to the at least one target probe packet; and determining, by the target slave node, the local clock offset of the another node relative to the target slave node based on the clock offset relationship.

5. The method of claim 1, wherein the plurality of local clock offsets comprise a plurality of clock offsets of the master node relative to the plurality of slave nodes.

6. The method of claim 1, wherein the plurality of local clock offsets comprise a clock offset of a slave node relative to the master node and a clock offset of one slave node relative to another slave node.

7. A clock synchronization method in a distributed system, wherein the distributed system comprises a plurality of nodes, the plurality of nodes comprise a master node and a plurality of slave nodes, and the method comprises:

obtaining, by the master node, a plurality of local clock offsets, wherein each of the plurality of local clock offsets indicates a clock offset between two nodes in the distributed system;

determining, by the master node, a first global clock offset of a target slave node in the plurality of slave nodes relative to the master node based on performing error equalization on the plurality of local clock offsets; and sending, by the master node, the first global clock offset to the target slave node, wherein the target slave node performs clock synchronization based on the first global clock offset.

8. The method according to claim 7, wherein a topology diagram of the distributed system comprises at least one linearly independent loop, each linearly independent loop comprises at least three nodes associated based on a clockwise or counterclockwise directional relationship, every two of the at least three nodes having a directional relationship have one local clock offset, and the at least three nodes comprise the master node, or the at least three nodes are all slave nodes.

9. The method according to claim 7, wherein the plurality of local clock offsets comprise a local clock offset of another node relative to the master node, and the method further comprises:

sending, by the master node, a plurality of probe packets to the another node;

receiving, by the master node, a plurality of response packets corresponding to the plurality of probe packets sent by the another node, wherein the plurality of probe packets are in a one-to-one correspondence with the plurality of response packets;

determining, by the master node, a clock offset relationship between the master node and the another node based on sending time points and receiving time points of the plurality of probe packets and sending time points and receiving time points of the plurality of response packets; and determining, by the master node, the local clock offset of the another node relative to the master node based on the clock offset relationship.

10. The method according to claim 7, wherein the plurality of local clock offsets comprise a local clock offset of another node relative to the master node, and the method further comprises:

sending, by the master node, a plurality of probe packets to the another node;

receiving, by the master node, a plurality of response packets corresponding to the plurality of probe packets sent by the another node, wherein the plurality of probe packets are in a one-to-one correspondence with the plurality of response packets;

sending, by the master node, a plurality of follow-up packets, wherein the plurality of follow-up packets are in a one-to-one correspondence with the plurality of probe packets, and an interval between a sending time point of each probe packet and a sending time point of a follow-up packet corresponding to the probe packet is within a first preset time interval;

determining, by the master node, at least one target probe packet from the plurality of probe packets, wherein an interval between a receiving time point at which the another node receives the at least one target probe packet and a receiving time point at which the another node receives a follow-up packet corresponding to the at least one target probe packet is within a second preset time interval;

determining, by the master node, a clock offset relationship between the master node and the another node based on a sending time point and the receiving time point of the at least one target probe packet and a sending time point and a receiving time point of a response packet corresponding to the at least one target probe packet; and determining, by the master node, the local clock offset of the another node relative to the master node based on the clock offset relationship.

11. The method according to claim 9, wherein the determining, by the master node, a first global clock offset of a target slave node in the plurality of slave nodes relative to the master node based on the plurality of local clock offsets comprises:

correcting, by the master node, the plurality of local clock offsets to obtain a plurality of corrected local clock offsets, wherein a sum of the plurality of corrected local clock offsets is equal to 0, the plurality of corrected local clock offsets comprise a second global clock offset of a first slave node relative to the master node, the first slave node has a direct directional relationship with the master node, and the target slave node is the first slave node, and the second global clock offset is the first global clock offset.

12. The method according to claim 11, wherein the determining, by the master node, a first global clock offset of a target slave node in the plurality of slave nodes relative to the master node based on the plurality of local clock offsets comprises:

determining, by the master node, a clock offset relationship between a second slave node and the master node based on a clock offset relationship between the first slave node and the master node and a clock offset relationship between the second slave node and a first master node, wherein the first slave node has a direct directional relationship with the master node, and the second slave node has no direct directional relationship with the master node; and determining, by the master node, a third global clock offset of the second slave node relative to the master node based on the clock offset relationship between the second slave node and the master node, wherein the target slave node is the second slave node, and the third global clock offset is the first global clock offset.

13. The method according to claim 7, wherein a clock source of the master node is from a satellite clock.

14. A distributed system, comprising a plurality of nodes, wherein the plurality of nodes comprise a master node and a plurality of slave nodes;

the master node is configured to:
obtain a plurality of local clock offsets, wherein each of the plurality of local clock offsets indicates a clock offset between two nodes in the distributed system;
determine a first global clock offset of a target slave node in the plurality of slave nodes relative to the master node based on performing error equalization on the plurality of local clock offsets; and
send the first global clock offset to the target slave node; and the target slave node is configured to:
receive the first global clock offset of the target slave node relative to the master node sent by the master node;
obtain a clock reference value, wherein the clock reference value indicates a local clock of the target slave node; and
perform clock synchronization based on the clock reference value and the first global clock offset.

15. The distributed system according to claim 14, wherein the target slave node is configured to obtain the clock reference value from a register of a processor, wherein the clock reference value is synchronized by a network adapter device of the target slave node to the register over a physical link between the network adapter device and the processor.

16. The distributed system according to claim 14, wherein a topology diagram of the distributed system comprises at least one linearly independent loop, each linearly independent loop comprises at least three nodes associated based on a clockwise or counterclockwise directional relationship, every two of the at least three nodes having a directional relationship have one local clock offset, and the at least three nodes comprise the master node, or the at least three nodes are all slave nodes.

17. The distributed system according to claim 14, wherein one node of the two nodes is configured to:
send a plurality of probe packets to the other node;
receive a plurality of response packets corresponding to the plurality of probe packets sent by the other node, wherein the plurality of probe packets are in a one-to-one correspondence with the plurality of response packets;
determine a clock offset relationship between the master node and the other node based on sending time points and receiving time points of the plurality of probe packets and sending time points and receiving time points of the plurality of response packets; and
determine a local clock offset of the other node relative to the one node based on the clock offset relationship, wherein the one node is the master node or the target slave node.

18. The distributed system according to claim 14, wherein one node of the two nodes is configured to:
send a plurality of probe packets to the other node;
receive a plurality of response packets corresponding to the plurality of probe packets sent by the other node, wherein the plurality of probe packets are in a one-to-one correspondence with the plurality of response packets;
send a plurality of follow-up packets, wherein the plurality of follow-up packets are in a one-to-one correspondence with the plurality of probe packets, and an interval between a sending time point of each probe packet and a sending time point of a follow-up packet corresponding to the probe packet is within a first preset time interval;
determine at least one target probe packet from the plurality of probe packets, wherein an interval between a receiving time point at which the other node receives the at least one target probe packet and a receiving time point at which the other node receives a follow-up packet corresponding to the at least one target probe packet is within a second preset time interval;
determine a clock offset relationship between the one node and the other node based on a sending time point and the receiving time point of the at least one target probe packet and a sending time point and a receiving time point of a response packet corresponding to the at least one target probe packet; and
determine a local clock offset of the other node relative to the one node based on the clock offset relationship.

19. The distributed system according to claim 17, wherein the master node is configured to:
correct the plurality of local clock offsets to obtain a plurality of corrected local clock offsets, wherein a sum of the plurality of corrected local clock offsets is equal to 0, the plurality of corrected local clock offsets comprise a second global clock offset of a first slave node relative to the master node, the first slave node has a direct directional relationship with the master node, and the target slave node is the first slave node, and the second global clock offset is the first global clock offset.

20. The distributed system according to claim 19, wherein the master node is configured to:
determine a clock offset relationship between a second slave node and the master node based on a clock offset relationship between the first slave node and the master node and a clock offset relationship between the second slave node and a first master node, wherein the first slave node has a direct directional relationship with the master node, and the second slave node has no direct directional relationship with the master node; and
determine a third global clock offset of the second slave node relative to the master node based on the clock offset relationship between the second slave node and the master node, wherein the target slave node is the second slave node, and the third global clock offset is the first global clock offset.

* * * * *